(12) United States Patent
Abe et al.

(10) Patent No.: US 8,334,876 B2
(45) Date of Patent: *Dec. 18, 2012

(54) SIGNAL PROCESSING DEVICE AND PROJECTION DISPLAY APPARATUS

(75) Inventors: Takaaki Abe, Osaka (JP); Masutaka Inoue, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 682 days.

This patent is subject to a terminal disclaimer.

(21) Appl. No.: 12/470,119

(22) Filed: May 21, 2009

(65) Prior Publication Data

US 2009/0290068 A1 Nov. 26, 2009

(30) Foreign Application Priority Data

May 22, 2008 (JP) ................................. 2008-134828
Dec. 26, 2008 (JP) ................................. 2008-334985

(51) Int. Cl.
| G09G 5/00 | (2006.01) |
| G09G 5/02 | (2006.01) |
| H04N 5/57 | (2006.01) |
| H04N 9/68 | (2006.01) |
| H04N 1/40 | (2006.01) |
| G03F 3/08 | (2006.01) |
| G06K 9/00 | (2006.01) |
| G06K 9/40 | (2006.01) |
| G06K 9/54 | (2006.01) |

(52) U.S. Cl. ........ 345/589; 345/428; 345/581; 345/600; 345/606; 345/619; 348/603; 348/645; 348/673; 348/687; 348/703; 358/518; 358/520; 358/461; 382/162; 382/167; 382/254; 382/274

(58) Field of Classification Search .................. 345/426, 345/428, 581, 589–591, 600–606, 619; 348/180, 348/253, 254–256, 557, 571, 602–603, 630, 348/671, 673–675, 686–687, 703, 708, 645–649; 358/525, 515–520, 448, 461; 382/162–167, 382/254, 274–276

See application file for complete search history.

(56) References Cited

U.S. PATENT DOCUMENTS

| 6,701,007 | B1 * | 3/2004 | Yamaguchi | 382/162 |
| 2003/0133609 | A1 * | 7/2003 | Ubillos et al. | 382/167 |
| 2006/0251323 | A1 * | 11/2006 | MacKinnon et al. | 382/167 |
| 2009/0022395 | A1 * | 1/2009 | Cho et al. | 382/167 |
| 2009/0290068 | A1 * | 11/2009 | Abe et al. | 348/649 |
| 2010/0002104 | A1 * | 1/2010 | On et al. | 348/252 |
| 2011/0013041 | A1 * | 1/2011 | Abe et al. | 348/222.1 |

FOREIGN PATENT DOCUMENTS

JP 2000-324350 A 11/2000

* cited by examiner

*Primary Examiner* — Wesner Sajous
(74) *Attorney, Agent, or Firm* — NDQ&M Watchstone LLP

(57) ABSTRACT

A signal processing device including: a color coordinate adjuster performing color coordinate adjustment processing for adjusting color coordinates of an image input signal according to a color reproduction range of a display device; a brightness adjuster performing brightness adjustment processing for adjusting a brightness component of the image input signal; and a coefficient controller controlling a color coordinate adjustment coefficient and a brightness adjustment coefficient. The coefficient controller controls the brightness adjustment coefficient so as to decrease the brightness component of the image input signal, when saturation of a pixel having a first hue is high, controls the brightness adjustment coefficient so as to increase the brightness component of the image input signal, when saturation of a pixel having a second hue is high, and decreases the brightness adjustment coefficient when increasing the color coordinate adjustment coefficient.

14 Claims, 18 Drawing Sheets

SIGNAL PROCESSING DEVICE AND PROJECTION DISPLAY APPARATUS

CROSS REFERENCE TO RELATED APPLICATIONS

This application is based upon and claims the benefit of priority from prior Japanese Patent Application No. 2008-134828, filed on May 22, 2008; and prior Japanese Patent Application No. 2008-334985, filed on Dec. 26, 2008; the entire contents of which are incorporated herein by reference.

BACKGROUND OF THE INVENTION

1. Field of the Invention

The present invention relates to a signal processing device and a projection display apparatus, which convert an image input signal into an image output signal.

2. Description of the Related Art

Heretofore, there has been known a display device configured to display images captured with an imaging device such as a camera. Solid-state light sources (for example, laser diodes (LDs) or light-emitting diodes (LEDs)) having a wide color reproduction range have been developed as light sources for illuminating such a display device. Here, there may be a case where a color reproduction range of the display device is different from that of the imaging device.

To handle such a case, a technique (for example, Japanese Patent Publication No. 2000-324350) has been proposed for reducing a color reproduction range of an input device (for example, an imaging device) when the color reproduction range of an input device gets wider than that of an output device (for example, a display device). Specifically, a direction to reduce the color reproduction range is changed for each hue to produce a natural-looking image.

On the other hand, consider a case where a color reproduction range of an output device (for example, a display device) gets wider than that of an input device (for example, an imaging device). In such a case, when the output device displays an image according to an image input signal inputted from the input device, color coordinates of the image result is wider than those of an actual object. Note that the color coordinates are defined by saturation and hue.

SUMMARY OF THE INVENTION

A signal processing device according to a first aspect of the present invention converts an image input signal into an image output signal and outputs the image output signal to a display device. The signal processing device includes: a color coordinate adjuster (color coordinate adjuster 260) configured to perform color coordinate adjustment processing for adjusting color coordinates of the image input signal according to a color reproduction range of the display device; a brightness adjuster (brightness adjuster 230) configured to perform brightness adjustment processing for adjusting a brightness component of the image input signal; an output signal outputting unit (display element controller 270) configured to output the image output signal calculated by using results of the color coordinate adjustment processing and the brightness adjustment processing; and a controller (coefficient controller 220) configured to control a color coordinate adjustment coefficient and a brightness adjustment coefficient on the basis of values of a pixel having a first hue (for example, a hue of red or green) and values of a pixel having a second hue (for example, a hue of blue), the color coordinate adjustment coefficient used for the color coordinate adjustment processing, the brightness adjustment coefficient used for the brightness adjustment processing. The controller controls the brightness adjustment coefficient so as to decrease the brightness component of the image input signal, when saturation of the pixel having the first hue is high, controls the brightness adjustment coefficient so as to increase the brightness component of the image input signal, when saturation of the pixel having the second hue is high, and decreases the brightness adjustment coefficient when increasing the color coordinate adjustment coefficient.

In the first aspect, the controller corrects the color coordinate adjustment coefficient and the brightness adjustment coefficient for each predetermined pixel unit.

In the first aspect, the signal processing device further includes a saturation adjuster (saturation adjuster 240) configured to perform saturation adjustment processing for adjusting a saturation component of the image input signal. The controller controls a saturation adjustment coefficient on the basis of the values of the pixel having the first hue and the values of the pixel having the second hue, and decreases the saturation adjustment coefficient when increasing the color coordinate adjustment coefficient, the saturation adjustment coefficient used for the saturation adjustment processing.

In the first aspect, the controller controls the color coordinate adjustment coefficient and the brightness adjustment coefficient on the basis of values of a pixel having a third hue (for example, a skin hue).

In the first aspect, the first hue corresponds to a hue of red or green, and the second hue corresponds to a hue of blue.

A projection display apparatus according to a second aspect of the present invention includes: the signal processing device (signal processing device 200) according to the first aspect; a display device (liquid crystal panel 30) configured to display an image according to an image output signal outputted from the signal processing device; and a projector (projection lens unit 50) configured to project the image displayed on the display device.

A signal processing device according to a third aspect of the present invention converts an image input signal into an image output signal and outputting the image output signal to a display device. The signal processing device includes: a color coordinate adjuster configured to perform color coordinate adjustment processing for adjusting color coordinates of the image input signal according to a color reproduction range of the display device; a brightness adjuster configured to perform brightness adjustment processing for adjusting a brightness component of the image input signal; an output signal generator configured to generate the image output signal, based on the color coordinates adjusted by the color coordinate adjustment processing and the brightness component adjusted by the brightness adjustment processing; and a controller configured to control a color coordinate contribution degree and a brightness component contribution degree based on a saturation of the image input signal, the color coordinate contribution degree indicates a degree that the color coordinate adjustment processing influences the image output signal, the brightness component contribution degree indicates a degree that the brightness adjustment processing influences the image output signal. The controller increases the color coordinate contribution degree and decreases the brightness component contribution degree, as the saturation of the image input signal gets higher in a first specific hue or a second specific hue.

In the third aspect, the signal processing further includes: an acquisition unit configured to acquire a brightness of an image according to the image input signal. The controller increases a decreasing amount of the brightness component of the image input signal in the brightness adjustment processing, as the brightness acquired by the acquisition unit gets higher.

In the third aspect, the signal processing device further includes: an acquisition unit configured to acquire a hue of each pixel forming an image based on the image input signal. The first specific hue has a first hue range including a first target hue. The second specific hue has a second hue range including a second target hue. The controller increases the color coordinate contribution degree and decreases the brightness component contribution degree, as the hue acquired by acquisition unit is closer to the first target hue. The controller increases the color coordinate contribution degree and decreases the brightness component contribution degree, as the hue acquired by acquisition unit is closer to the second target hue.

In the third aspect, the signal processing device further includes: an acquisition unit configured to acquire a hue of each pixel forming an image based on the image input signal. The controller increases the brightness component contribution degree and decreases the color coordinate contribution degree, as a first hue distribution range gets wider, the first hue distribution range indicates a range of the hue acquired by the acquisition unit distributed in the first specific hue. The controller increases the brightness component contribution degree and decreases the color coordinate contribution degree, as a second hue distribution range gets wider, the second hue distribution range indicates a range of the hue acquired by the acquisition unit distributed in the second specific hue.

In the third aspect, the signal processing device further includes: an acquisition unit configured to acquire a saturation of each pixel forming an image based on the image input signal. The controller increases the color coordinate contribution degree and decreases the brightness component contribution degree, as the saturation acquired by the acquisition unit gets higher.

In the third aspect, the signal processing device further includes: an acquisition unit configured to acquire a saturation of each pixel forming an image based on the image input signal. The controller increases the brightness component contribution degree and decreases the color coordinate contribution degree, as a first saturation distribution range gets wider, the first saturation distribution range indicates a range of the saturation acquired by the acquisition unit distributed in the first specific hue. The controller increases the brightness component contribution degree and decreases the color coordinate contribution degree, as a second saturation distribution range gets wider, the second saturation distribution range indicates a range of the saturation acquired by the acquisition unit distributed in the second specific hue.

In the third aspect, the controller controls the color coordinate contribution degree and the brightness component contribution degree for each pixel.

A projection display apparatus according to a fourth aspect of the present invention includes: the signal processing device according to the third aspect; a display device configured to display an image according to an image output signal outputted from the signal processing device; and a projector configured to project the image displayed on the display device.

DESCRIPTION OF THE PREFERRED EMBODIMENT

Figure 1:
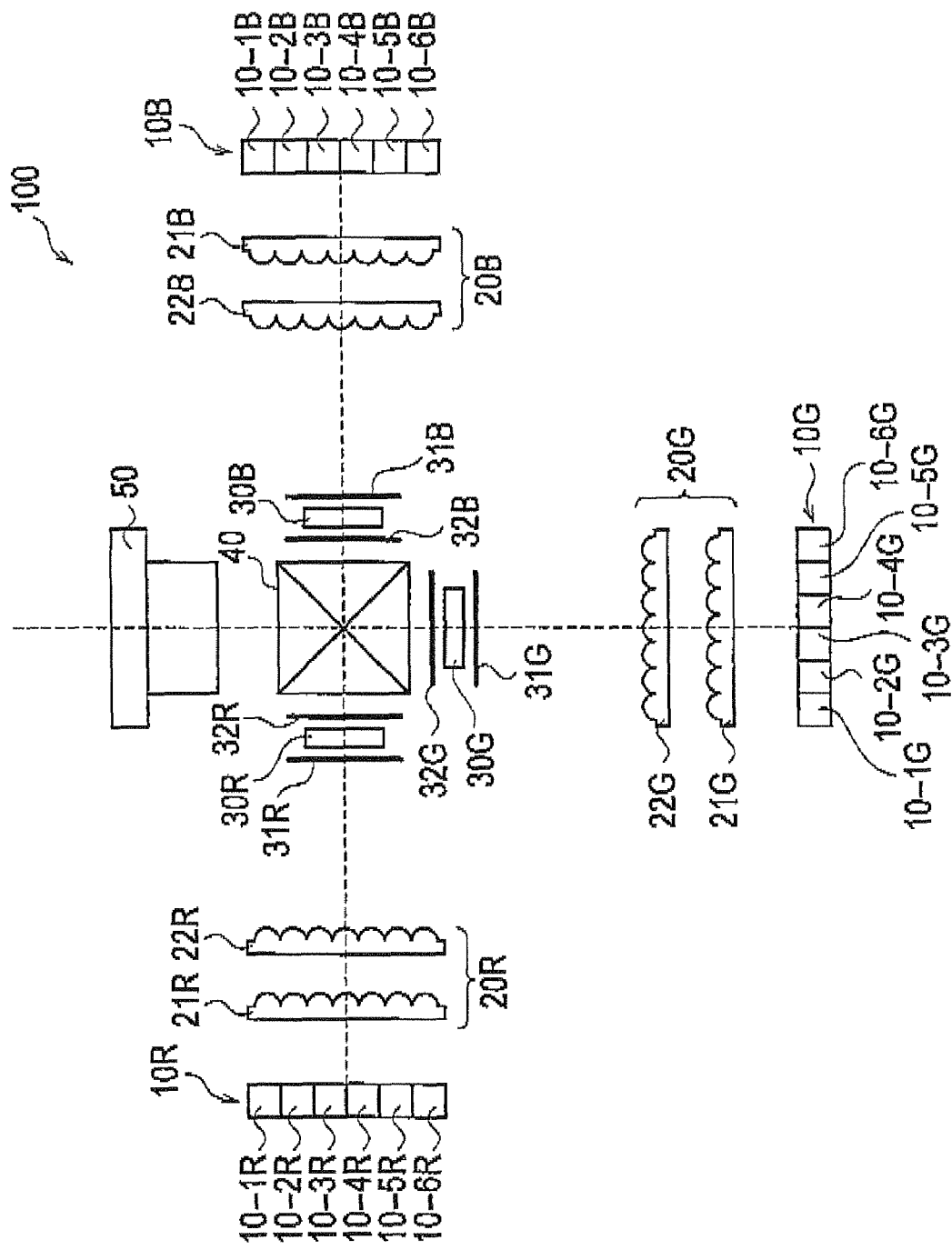
FIG. 1 is a view showing a configuration of a projection display apparatus according to a first embodiment of the present invention.

Hereinafter, a projection display apparatus according to an embodiment of the present invention will be described with reference to the drawings. Note that, in the following description of the drawings, the same or similar constitutions will be denoted by the same or similar reference numerals.

However, it should be noted that the drawings are schematic and that proportions of dimensions and the like are different from actual ones. Thus, specific dimensions and the like should be determined by referring to the description below. Naturally, there are constitutions where relations or proportions of dimensions are different between the drawings.

[Outline of Embodiment]

Firstly, a signal processing device according to the embodiment converts an image input signal into an image output signal and outputs the image output signal to a display device. The signal processing device includes: a color coordinate adjuster performing color coordinate adjustment processing for adjusting color coordinates of the image input signal according to a color reproduction range of the display device; a brightness adjuster performing brightness adjustment processing for adjusting a brightness component of the image input signal; an output signal outputting unit outputting the image output signal obtained by using results of the color coordinate adjustment processing and the brightness adjustment processing; and a controller controlling a color coordinate adjustment coefficient and a brightness adjustment coefficient on the basis of values of a pixel having a first hue and values of a pixel having a second hue, the color coordinate adjustment coefficient used for the color coordinate adjustment processing, the brightness adjustment coefficient used for the brightness adjustment processing.

The controller controls the brightness adjustment coefficient so as to decrease the brightness component of the image input signal, when saturation of the pixel having the first hue is high, controls the brightness adjustment coefficient so as to increase the brightness component of the image input signal, when saturation of the pixel having the second hue is high, and decreases the brightness adjustment coefficient when increasing the color coordinate adjustment coefficient.

According to the embodiment, the controller makes the brightness component of the image input signal smaller when the saturation of the pixel having the first hue (for example, a hue of red or green) is high, thereby reducing "glare." On the other hand, the controller makes the brightness component of the image input signal larger when the saturation of the pixel having the second hue (for example, a hue of blue) is high, thereby causing "color shifts" purposely and thus reducing "glare."

Secondly, a signal processing device according to a third aspect of the present invention converts an image input signal into an image output signal and outputting the image output signal to a display device. The signal processing device includes: a color coordinate adjuster configured to perform color coordinate adjustment processing for adjusting color coordinates of the image input signal according to a color reproduction range of the display device; a brightness adjuster configured to perform brightness adjustment processing for adjusting a brightness component of the image input signal; an output signal generator configured to generate the image output signal, based on the color coordinates adjusted by the color coordinate adjustment processing and the brightness component adjusted by the brightness adjustment processing; and a controller configured to control a color coordinate contribution degree and a brightness component contribution degree based on a saturation of the image input signal, the color coordinate contribution degree indicates a degree that the color coordinate adjustment processing influences the image output signal, the brightness component contribution degree indicates a degree that the brightness adjustment processing influences the image output signal.

The controller increases the color coordinate contribution degree and decreases the brightness component contribution degree, as the saturation of the image input signal gets higher in a first specific hue or a second specific hue.

According to the embodiment, the controller increases the color coordinate contribution degree and decreases the brightness component contribution degree, in the case where the saturation of the image input signal is higher than the predetermined threshold in the first specific hue or the second specific hue, that is, in the case where a difference between a color coordinates of an image and a color coordinates of an actual object is large.

Accordingly, the difference between the color coordinates of the image and the color coordinates of the actual object may be suppressed, when the difference between the color coordinates of the image and the color coordinates of the actual object is large.

On the contrary, the controller decreases the color coordinate contribution degree and increases the brightness component contribution degree, in the case where the saturation of the image input signal is lower than the predetermined threshold in the first specific hue or the second specific hue, that is, in the case where the difference between the color coordinates of the image and the color coordinates of the actual object is small.

Accordingly, the color reproduction range of the liquid crystal panel may be effectively utilized, when the difference between the color coordinates of the image and the color coordinates of the actual object is small.

Note that, the "brightness" in the embodiment is a term which denotes brightness. Thus, the "brightness" should be interpreted as a term which denotes a broad concept including luminance.

Further, the brightness adjustment processing is processing for adjusting "brightness components" of the image input signal. The "brightness component" is a term which denotes a component of brightness as similar to the "brightness". Thus, the "brightness component" should be interpreted as a term which denotes a broad concept including a luminance component. Furthermore, the "brightness components" may be maximum values of the image input signal (a red input signal $R_{in}$, a green input signal $G_{in}$, and a blue input signal $B_{in}$).

[First Embodiment]

(Configuration of Projection Display Apparatus)

A configuration of a projection display apparatus according to a first embodiment of the present invention will be described below with reference to the drawing. FIG. 1 is a view showing a configuration of a projection display apparatus 100 according to the first embodiment.

As shown in FIG. 1, the projection display apparatus 100 includes multiple light source units 10, multiple fly-eye lens units 20, multiple liquid crystal panels 30, a cross dichroic prism 40, and a projection lens unit 50.

The multiple light source units 10 include light source units 10R, 10G, and 10B. Each light source unit 10 is formed of multiple solid-state light sources. Each solid-state light source is a laser diode (LD) or a light-emitting diode (LED), for example. Here, the light source unit 10R is formed of multiple solid-state light sources (10-1R to 10-6R) each emitting a red light beam. The light source unit 10G is formed of multiple solid-state light sources (10-1G to 10-6G) each emitting a green light beam. The light source unit 10B is formed of multiple solid-state light sources (10-1B to 10-6B) each emitting a blue light beam.

The multiple fly-eye lens units 20 include fly-eye lens units 20R, 20G, and 20B. Each fly-eye lens unit 20 is formed of fly-eye lenses 21 and 22. The fly-eye lenses 21 and 22 are each formed of multiple microlenses. Each microlens concentrates the light beam emitted from each light source unit 10 so that the light beam emitted from each light source unit 10 may be illuminated on the entire surface of the corresponding liquid crystal panel 30.

The multiple liquid crystal panels 30 include liquid crystal panels 30R, 30G, and 30B. The liquid crystal panel 30R modulates the red light beam by rotating the polarization direction of the red light beam. A light-incident-side polarizing plate 31R is provided at the light-incident-surface side of the liquid crystal panel 30R. The light-incident-side polarizing plate 31R transmits a red light component polarized in one direction (for example, a red light component polarized in the p-polarization) and shields a red light component polarized in the other direction (for example, a red light component polarized in the s-polarization). Meanwhile, a light-emitting-side polarizing plate 32R is provided at the light-emitting-surface side of the liquid crystal panel 30R. The light-emitting-side polarizing plate 32R shields the red light component polarized in one direction (for example, the red light component polarized in the p-polarization) and transmits the red light component polarized in the other direction (for example, the red light component polarized in the s-polarization).

Similarly, the liquid crystal panels 30G and 30B respectively modulate the green light beam and the blue light beam by rotating polarizing directions of the green light beam and the blue light beam. A light-incident-side polarizing plate 31G is provided at the light-incident-surface side of the liquid crystal panel 30G, and a light-emitting-side polarizing plate 32G is provided at the light-emitting-surface side of the liquid crystal panel 30G. Meanwhile, a light-incident-side polarizing plate 31B is provided at the light-incident-surface side of the liquid crystal panel 30B, and a light-emitting-side polarizing plate 32B is provided at the light-emitting-surface side of the liquid crystal panel 30B.

The cross dichroic prism 40 synthesizes the light beams emitted from the liquid crystal panels 30R, 30G and 30B. Then, the cross dichroic prism 40 emits the light thus synthesized toward the projection lens unit 50.

The projection lens unit 50 projects the synthesized light (image light) emitted from the cross dichroic prism 40 on a screen or the like.

(Hue and Saturation)

Figure 2:
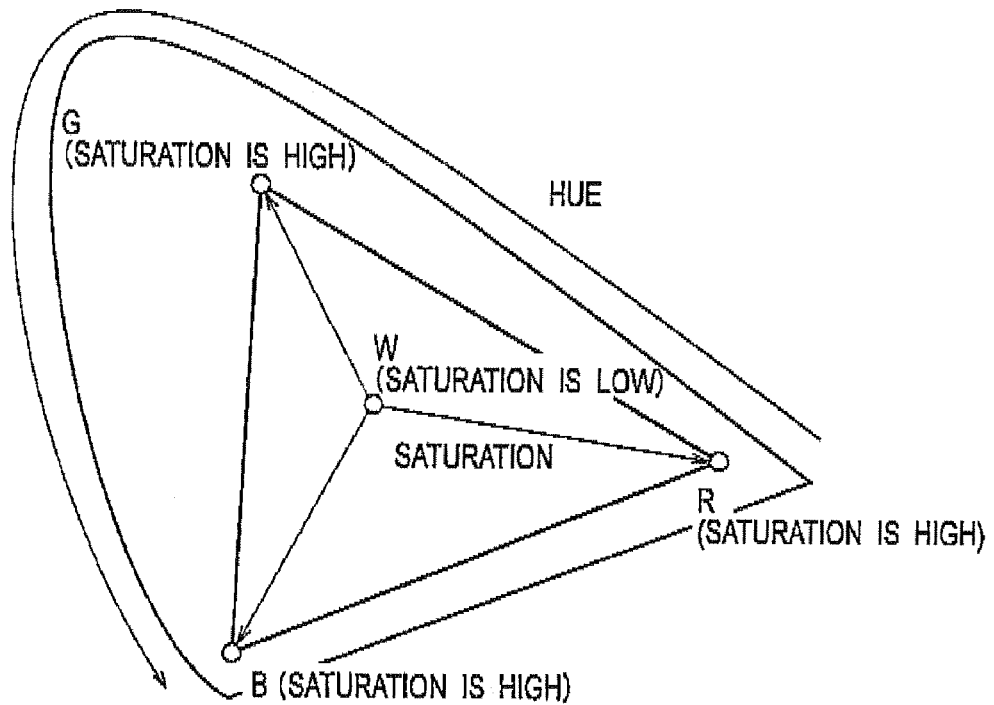
FIG. 2 is a diagram showing a general color reproduction range representing hue and saturation.

Hue and saturation according to the first embodiment will be described below with reference to the drawings. FIG. 2 is a chromaticity diagram showing a general color reproduction range representing hue and saturation. In FIG. 2, a point W represents white. Points R, G, and B represent red, green, and blue, respectively.

As shown in FIG. 2, hue is expressed by an angle formed by the point W and the outer periphery of the color reproduction range. Saturation is the lowest at the point W and becomes higher with distance from the point W.

Meanwhile, an image input signal is inputted from an input device (for example, an imaging device) to the projection display apparatus 100 according to the first embodiment.

A color reproduction range of each liquid crystal panel 30 depends on the light emitted from the corresponding light source unit 10. Specifically, as the color purity of the light emitted from each light source unit 10 gets higher, the color reproduction range of the corresponding liquid crystal panel 30 becomes wider. On the other hand, the color reproduction range of the input device depends on the accuracy of an imaging element and the like installed in the input device.

Figure 3:
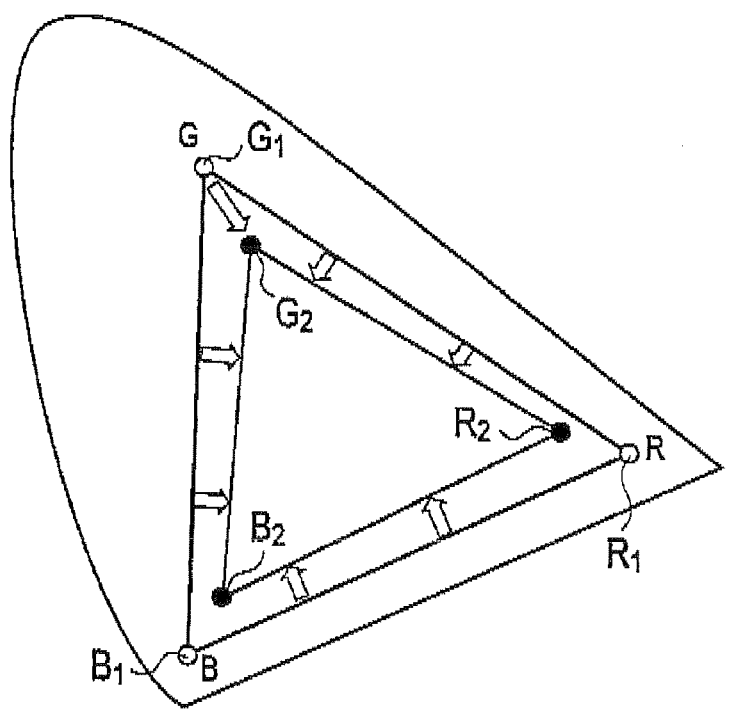
FIG. 3 is a diagram showing a color reproduction range of a liquid crystal panel 30 according to the first embodiment.

In the first embodiment, consider a case where the color reproduction range ($R_1$, $G_1$, $B_1$) of the liquid crystal panel 30 is wider than the color reproduction range ($R_2$, $G_2$, $B_2$) of the input device, as shown in FIG. 3.

(Functions of Projection Display Apparatus)

Figure 4:
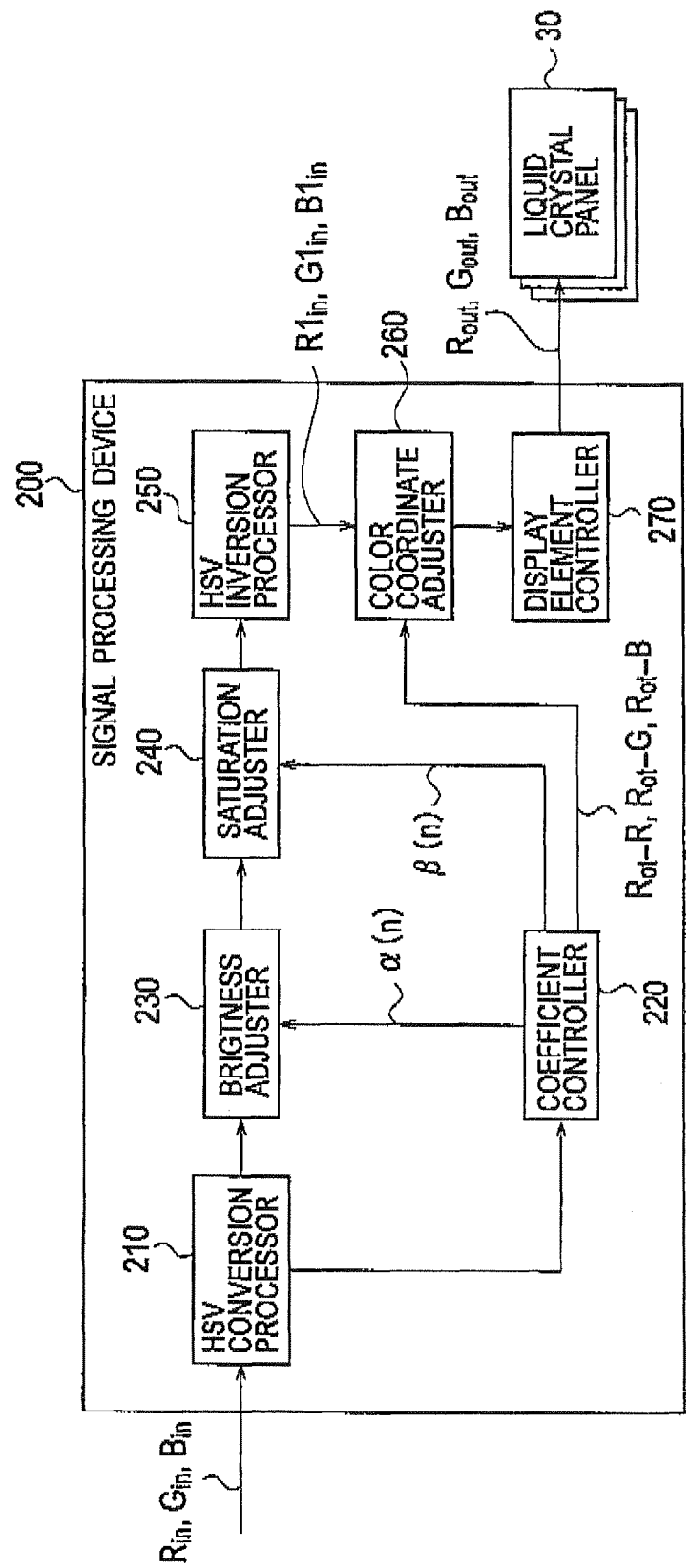
FIG. 4 is a block diagram showing a configuration of a signal processing device 200 according to the first embodiment.

Functions of the projection display apparatus according to the first embodiment will be described below with reference to the drawings. FIG. 4 is a block diagram showing functions of the projection display apparatus 100 (a signal processing device 200) according to the first embodiment.

The signal processing device 200 converts an image input signal to an image output signal. The image input signal includes a red input signal $R_{in}$, a green input signal $G_{in}$, and a blue input signal $B_{in}$. The image output signal includes a red output signal gouts a green output signal $G_{out}$, and a blue output signal $B_{out}$.

Here, each of the red input signal $R_{in}$, the green input signal $G_{in}$, and the blue input signal $B_{in}$ has a value in a range from the smallest pixel value (for example, "0") to the largest pixel value (for example, "255"). Likewise, each of the red output signal $R_{out}$, the green output signal $G_{out}$, and the blue output signal $B_{out}$ has a value in a range from the smallest pixel value (for example, "0") to the largest pixel value (for example, "255").

As shown in FIG. 4, the signal processing device 200 includes an HSV conversion processor 210, a coefficient controller 220, a brightness adjuster 230, a saturation adjuster 240, an HSV inversion processor 250, a color coordinate adjuster 260, and a display element controller 270.

The HSV conversion processor 210 calculates an input saturation component $S_{in}$, an input hue component $H_{in}$, and an input brightness component $V_{in}$. Specifically, the HSV conversion processor 210 calculates these values on the basis of the red input signal $R_{in}$, the green input signal $G_{in}$, and the blue input signal $B_{in}$ according to the following formulae:

$$H_{in} = 60 \times \frac{Gin - Bin}{MAX - MIN} + 0 \text{ if MAX} = R_{in}$$ [Formula 1]

$$H_{in} = 60 \times \frac{Bin - Rin}{MAX - MIN} + 120 \text{ if MAX} = G_{in}$$

$$H_{in} = 60 \times \frac{Rin - Gin}{MAX - MIN} + 240 \text{ if MAX} = B_{in}$$

$$S_{in} = \frac{MAX - MIN}{MAX}$$

$$V_{in} = MAX$$

where MAX=any one of the largest values of $R_{in}$, $G_{in}$ and $B_{in}$, and MIN=any one of the smallest values of $R_{in}$, $G_{in}$, and $B_{in}$.

The coefficient controller 220 controls various coefficients. First, the coefficient controller 220 calculates a coefficient (color coordinate adjustment coefficient) to be used for color coordinate adjustment processing. Second, the coefficient controller 220 calculates a coefficient (brightness adjustment coefficient) to be used for brightness adjustment processing. Third, the coefficient controller 220 calculates a coefficient (saturation adjustment coefficient) to be used for saturation adjustment processing.

Firstly, the color coordinate adjustment coefficient (Rot_R, Rot_G and Rot_B) will be described. The color coordinate adjustment coefficient is calculated for each image (frame). The color coordinate adjustment coefficient includes the red color coordinate adjustment coefficient Rot_R, the green color coordinate adjustment coefficient Rot_G, and the blue color coordinate adjustment coefficient Rot_B.

The red color coordinate adjustment coefficient Rot_R is calculated on the basis of a hue average and a hue variance of pixels having a target hue. A region of the target hue to be used for calculation of the red color coordinate adjustment coefficient Rot_R is a red hue region. Here, the red hue region is in a range of ±30° of the central hue of red, for example. The red color coordinate adjustment coefficient Rot_R is in a range from MIN ($\geq 0$) to MAX ($\leq 1$).

The green color coordinate adjustment coefficient Rot_G is calculated on the basis of a hue average and a hue variance of pixels having a target hue. A region of the target hue to be used for calculation of the green color coordinate adjustment coefficient Rot_G is a green hue region. Here, the green hue region is in a range of ±30° of the central hue of green, for example. The green color coordinate adjustment coefficient Rot_G is in a range from MIN ($\geq 0$) to MAX ($\leq 1$).

The blue color coordinate adjustment coefficient Rot_B is calculated on the basis of a hue average and a hue variance of pixels having a target hue. A region of the target hue to be used for calculation of the blue color coordinate adjustment coefficient Rot_B is a blue hue region. Here, the blue hue region is in a range of ±30° of the central hue of blue, for example. The blue color coordinate adjustment coefficient Rot_B is in a range from MIN ($\geq 0$) to MAX ($\leq 1$).

Note that, each of the red color coordinate adjustment coefficient Rot_R, the green color coordinate adjustment coefficient Rot_G, and the blue color coordinate adjustment coefficient Rot_B is calculated for each image (frame) formed of multiple pixels.

It should be noted, in the first embodiment, that the red hue and the green hue represent a first hue, and that the blue hue represents a second hue.

A method of calculating the red color coordinate adjustment coefficient Rot_R (or the green color coordinate adjustment coefficient Rot_G or the blue color coordinate adjustment coefficient Rot_B) will be described with reference to FIGS. 5 and 6. Here, the method of calculating the red color coordinate adjustment coefficient Rot_R will be illustrated. The method of calculating the green color coordinate adjustment coefficient Rot_G or the blue color coordinate adjustment coefficient Rot_B is the same as the method of calculating the red color coordinate adjustment coefficient Rot_R.

Figure 5:
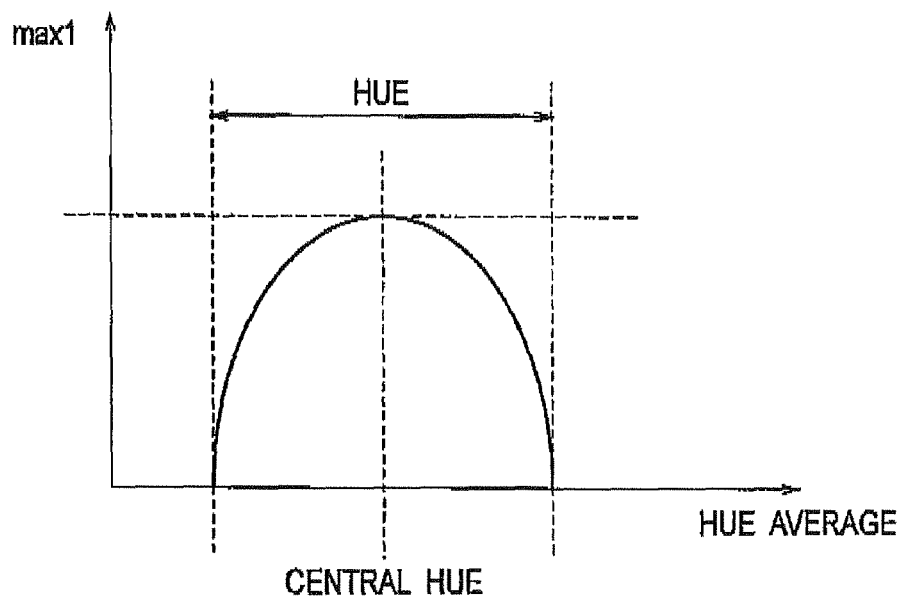
FIG. 5 is a graph for explaining a method of calculating a color coordinate adjustment coefficient according to the first embodiment.
Figure 6:
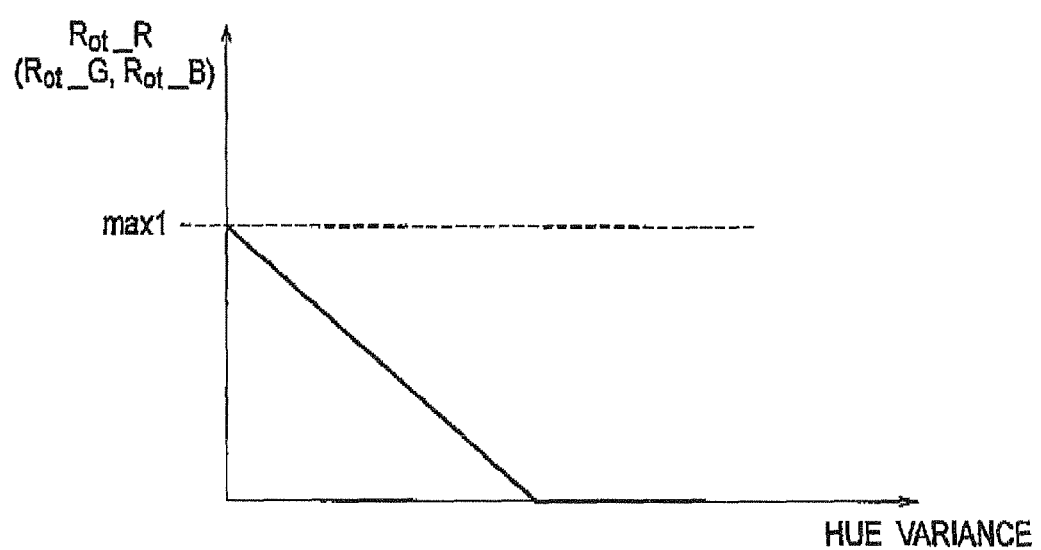
FIG. 6 is a graph for explaining the method of calculating the color coordinate adjustment coefficient according to the first embodiment.

Specifically, the coefficient controller 220 calculates a parameter max1 on the basis of the hue average, as shown in FIG. 5. Subsequently, the coefficient controller 220 calculates the red color coordinate adjustment coefficient Rot_R on the basis of the hue variance, as shown in FIG. 6. Here, the upper limit for the red color coordinate adjustment coefficient Rot_R is limited by the parameter max1.

As shown in FIG. 5, as the hue average is closer to the central hue (of red, here), the parameter max1 becomes larger. Moreover, as shown in FIG. 6, as the hue variance is smaller, the red color coordinate adjustment coefficient Rot_R becomes larger. In essence, as the hue average is closer to the central hue, or the hue variance is smaller, the red color coordinate adjustment coefficient Rot_R becomes larger.

Secondly, the brightness adjustment coefficient ($\alpha(n)$) will be described. The brightness adjustment coefficient ($\alpha(n)$) is calculated according to the following formula:

$$a(n) = (-R\_LUM - G\_LUM + B\_LUM) \times \begin{pmatrix} \Delta R(n) \\ \Delta G(n) \\ \Delta B(n) \end{pmatrix} \quad \text{[Formula 2]}$$

(1) Here, the red brightness adjustment coefficient R_LUM, the green brightness adjustment coefficient G_LUM, and the blue brightness adjustment coefficient B_LUM will be described.

The red brightness adjustment coefficient R_LUM is calculated on the basis of the red color coordinate adjustment coefficient Rot_R. As the red color coordinate adjustment coefficient Rot_R is larger, the red brightness adjustment coefficient R_LUM becomes smaller. The red brightness adjustment coefficient R_LUM is in a range from MIN ($\geq 0$) to MAX ($\leq 1$). Note that, a sign "−" is added to the red brightness adjustment coefficient R_LUM in calculation of the brightness adjustment coefficient.

The green brightness adjustment coefficient G_LUM is calculated on the basis of the green color coordinate adjustment coefficient Rot_G. As the green color coordinate adjustment coefficient Rot_G is larger, the green brightness adjustment coefficient G_LUM becomes smaller. The green brightness adjustment coefficient G_LUM is in a range from MIN ($\geq 0$) to MAX ($\leq 1$). Note that, a sign "−" is added to the green brightness adjustment coefficient G_LUM in calculation of the brightness adjustment coefficient.

The blue brightness adjustment coefficient B_LUM is calculated on the basis of the blue color coordinate adjustment coefficient Rot_B. As the blue color coordinate adjustment coefficient Rot_B is larger, the blue brightness adjustment coefficient B_LUM becomes smaller. The blue brightness adjustment coefficient B_LUM is in a range from MIN ($\geq 0$) to MAX ($\leq 1$). Note that, a sign "+" is added to the blue brightness adjustment coefficient B_LUM in calculation of the brightness adjustment coefficient.

Note that, each of the red brightness adjustment coefficient R_LUM, the green brightness adjustment coefficient G_LUM, and the blue brightness adjustment coefficient B_LUM is calculated for each image (frame) formed of multiple pixels, as similar to the red color coordinate adjustment coefficient Rot_R, the green color coordinate adjustment coefficient Rot_G, and the blue color coordinate adjustment coefficient Rot_B.

A method of calculating the red brightness adjustment coefficient R_LUM (or the green brightness adjustment coefficient G_LUM or the blue brightness adjustment coefficient B_LUM) will be described with reference to FIG. 7. Here, the method of calculating the red brightness adjustment coefficient R_LUM will be illustrated. The method of calculating the green brightness adjustment coefficient G_LUM or the blue brightness adjustment coefficient B_LUM is the same as the method of calculating the red brightness adjustment coefficient R_LUM.

Figure 7:
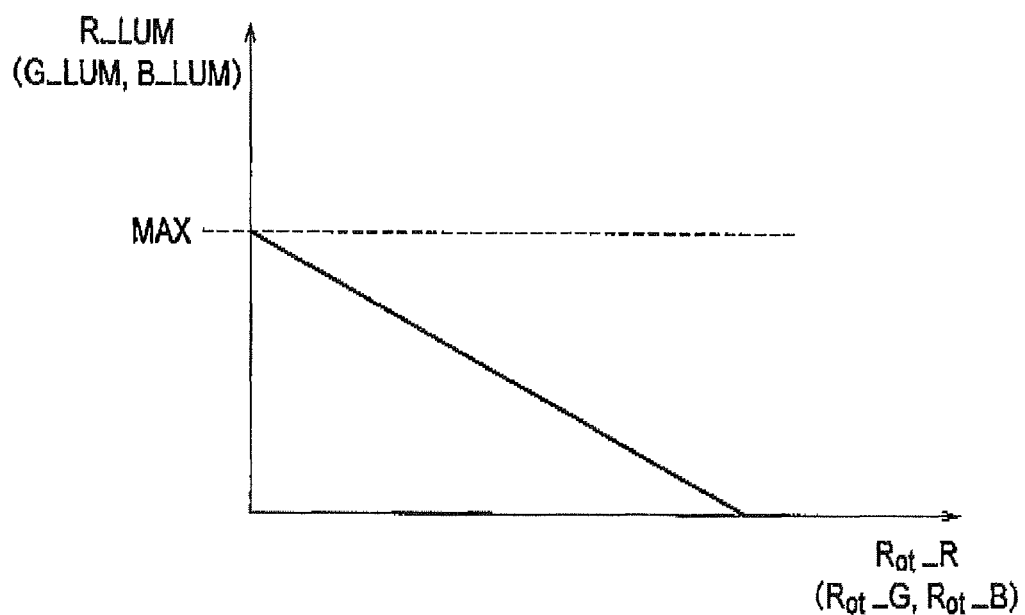
FIG. 7 is a graph for explaining a method of calculating a brightness adjustment coefficient according to the first embodiment.

Specifically, the coefficient controller 220 calculates the red brightness adjustment coefficient R_LUM on the basis of the red color coordinate adjustment coefficient Rot_R, as shown in FIG. 7. As described above, as the hue average is closer to the central hue (of red, here), or the hue variance is smaller, the red color coordinate adjustment coefficient Rot_R becomes larger. Accordingly, as the hue average is closer to the central hue, or the hue variance is smaller, the red brightness adjustment coefficient R_LUM becomes smaller.

(2) Next, the red pixel correction coefficient ΔR(n), the green pixel correction coefficient ΔG(n) and the blue pixel correction coefficient ΔB(n) will be described. Note that, as will be described later, the closer the hue of a target pixel (n) is to the central hue, or the higher the saturation of the target pixel (n) is, the larger the corresponding one of the red pixel correction coefficient ΔR(n), the green pixel correction coefficient ΔG(n) and the blue pixel correction coefficient ΔB(n) is (see FIGS. 8 and 9).

The red pixel correction coefficient ΔR(n) is calculated on the basis of the hue and saturation of the target pixel (n). Note that, the red pixel correction coefficient ΔR(n) takes the smallest value (for example, "0") when the hue of the target pixel (n) is not included in a red hue region. Here, the red hue region is in a range of ±30° of the central hue of red, for example. The red pixel correction coefficient ΔR(n) is in a range from MIN (≧0) to MAX (≦1).

The green pixel correction coefficient ΔG(n) is calculated on the basis of the hue and saturation of the target pixel (n). Note that, the green pixel correction coefficient ΔG(n) takes the smallest value (for example, "0") when the hue of the target pixel (n) is not included in a green hue region. Here, the green hue region is in a range of ±30° of the central hue of green, for example. The green pixel correction coefficient ΔG(n) is in a range from MIN (≧0) to MAX (≦1).

The blue pixel correction coefficient ΔB(n) is calculated on the basis of the hue and saturation of the target pixel (n). Note that, the blue pixel correction coefficient ΔB(n) takes the smallest value (for example, "0") when the hue of the target pixel (n) is not included in a blue hue region. Here, the blue hue region is in a range of ±30° of the central hue of blue, for example. The blue pixel correction coefficient ΔB(n) is in a range from MIN (≧0) to MAX (≦1).

Note that, each of the red pixel correction coefficient ΔR(n), the green pixel correction coefficient ΔG(n) and the blue pixel correction coefficient ΔB(n) is calculated for each of multiple pixels constituting an image (frame). Hence, the brightness adjustment coefficient (α(n)) is corrected for each of the multiple pixels constituting the image (frame).

A method of calculating the red pixel correction coefficient ΔR(n) (or the green pixel correction coefficient ΔG(n) or the blue pixel correction coefficient ΔB(n)) will be described with reference to FIGS. 8 and 9. Here, the method of calculating the red pixel correction coefficient ΔR(n) will be illustrated. The method of calculating the green pixel correction coefficient ΔG(n) or the blue pixel correction coefficient ΔB(n) is the same as the method of calculating the red pixel correction coefficient ΔR(n).

Figure 8:
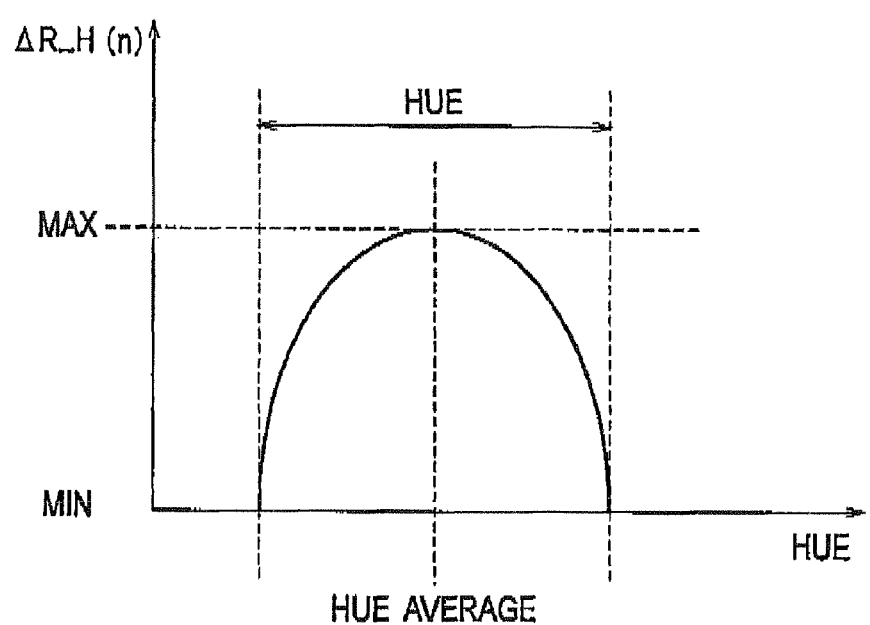
FIG. 8 is a graph for explaining a method of calculating a pixel correction coefficient according to the first embodiment.
Figure 9:
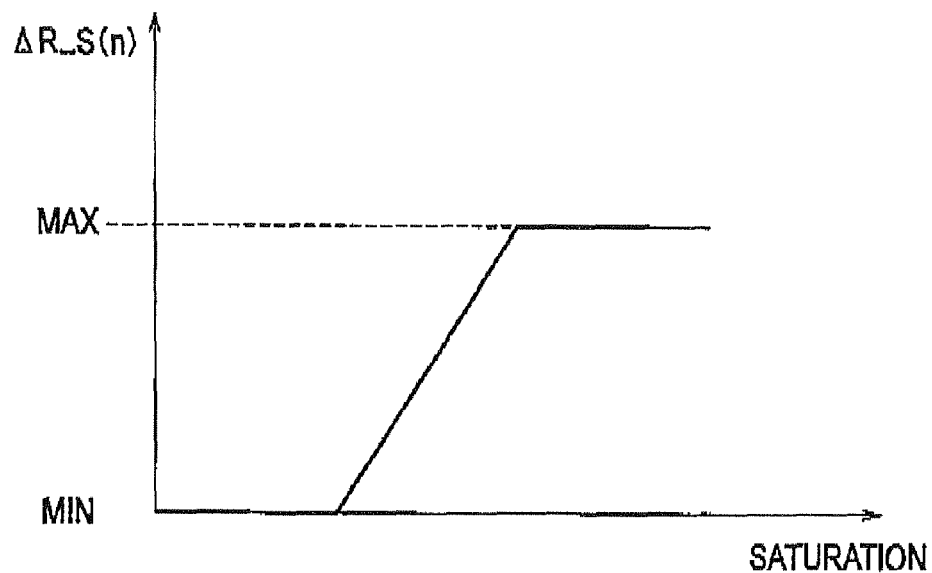
FIG. 9 is a graph for explaining the method of calculating the pixel correction coefficient according to the first embodiment.

Specifically, the coefficient controller 220 calculates a hue coefficient ΔR_H(n) on the basis of the hue of the target pixel (n), as shown in FIG. 8. Subsequently, the coefficient controller 220 calculates a saturation coefficient ΔR_S(n) on the basis of the saturation of the target pixel (n), as shown in FIG. 9. Lastly, the coefficient controller 220 calculates the red pixel correction coefficient ΔR(n) on the basis of the hue coefficient ΔR_H(n) and the saturation coefficient ΔR_S(n). The coefficient controller 220 calculates the red pixel correction coefficient ΔR(n) according to, for example, the following formula:

$$\Delta R(n) = \Delta R\_H(n) \times \Delta R\_S(n) \quad \text{[Formula 3]}$$

As shown in FIG. 8, as the hue of the target pixel (n) is closer to the central hue (of red, here), the hue coefficient ΔR_H(n) becomes larger. Moreover, as shown in FIG. 9, as the saturation of the target pixel (n) gets higher, the saturation coefficient ΔR_S(n) becomes larger. In essence, as the hue of the target pixel (n) is closer to the central hue, or the saturation of the target pixel (n) gets higher, the red pixel correction coefficient ΔR(n) becomes larger.

Thirdly, the saturation adjustment coefficient (β(n)) will be described. The saturation adjustment coefficient (β(n)) is calculated according to the following formula:

$$B(n) = (\text{R\_SAT} \; \text{G\_SAT} \; \text{B\_SAT}) \times \begin{pmatrix} \Delta R(n) \\ \Delta G(n) \\ \Delta B(n) \end{pmatrix} \quad \text{[Formula 4]}$$

(1) Here, the red saturation adjustment coefficient R_SAT, the green saturation adjustment coefficient G_SAT, and the blue saturation adjustment coefficient B_SAT will be described.

The red saturation adjustment coefficient R_SAT is calculated on the basis of the red color coordinate adjustment coefficient Rot_R. As the red color coordinate adjustment coefficient Rot_R is larger, the red saturation adjustment coefficient R_SAT becomes smaller. The red saturation adjustment coefficient R_SAT is in a range from MIN (≧0) to MAX (≦1). Note that, a sign "+" is added to the red saturation adjustment coefficient R_SAT in calculation of the saturation adjustment coefficient.

The green saturation adjustment coefficient G_SAT is calculated on the basis of the green color coordinate adjustment coefficient Rot_G. As the green color coordinate adjustment coefficient Rot_G is larger, the green saturation adjustment coefficient G_SAT becomes smaller. The green saturation adjustment coefficient G_SAT is in a range from MIN (≧0) to MAX (≦1). Note that, a sign "+" is added to the green saturation adjustment coefficient G_SAT in calculation of the saturation adjustment coefficient.

The blue saturation adjustment coefficient B_SAT is calculated on the basis of the blue color coordinate adjustment coefficient Rot_B. As the blue color coordinate adjustment coefficient Rot_B is larger, the blue saturation adjustment coefficient B_SAT becomes smaller. The blue saturation adjustment coefficient B_SAT is in a range from MIN (≧0) to MAX (≦1). Note that, a sign "+" is added to the blue saturation adjustment coefficient B_SAT in calculation of the saturation adjustment coefficient.

Note that, each of the red saturation adjustment coefficient R_SAT, the green saturation adjustment coefficient G_SAT, and the blue saturation adjustment coefficient B_SAT is calculated for each image (frame) formed of multiple pixels, as similar to the red color coordinate adjustment coefficient Rot_R, the green color coordinate adjustment coefficient Rot_G, and the blue color coordinate adjustment coefficient Rot_B.

A method of calculating the red saturation adjustment coefficient R_SAT (or the green saturation adjustment coefficient G_SAT or the blue saturation adjustment coefficient B_SAT) will be described with reference to FIG. 10. Here, the method of calculating the red saturation adjustment coefficient R_SAT will be illustrated. The method of calculating the green saturation adjustment coefficient G_SAT or the blue saturation adjustment coefficient B_SAT is the same as the method of calculating the red saturation adjustment coefficient R_SAT.

Figure 10:
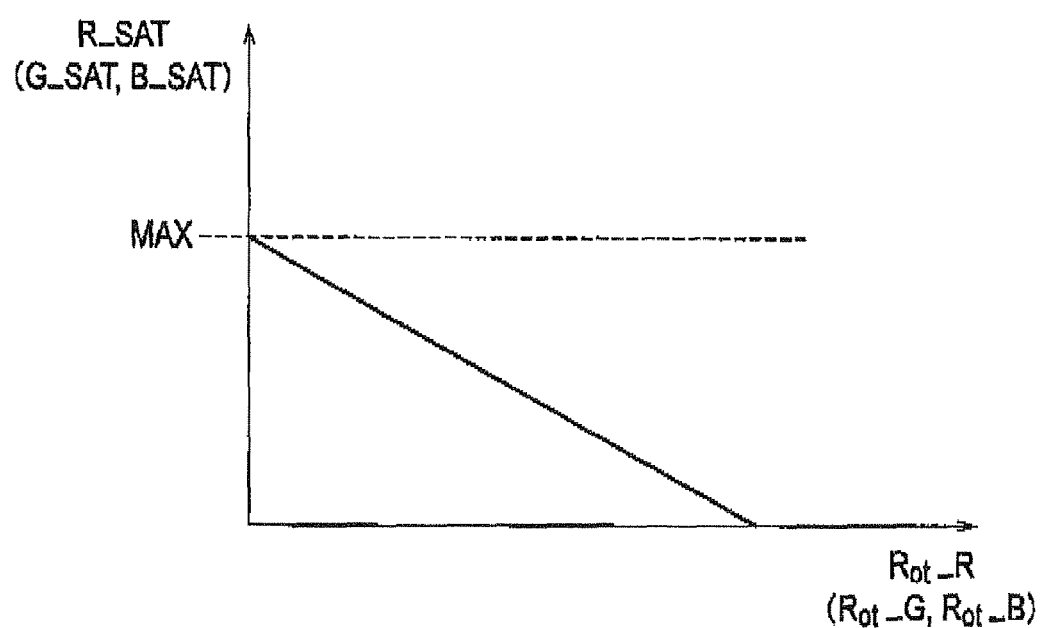
FIG. 10 is a graph for explaining a method of calculating a saturation adjustment coefficient according to the first embodiment.

Specifically, the coefficient controller 220 calculates the red saturation adjustment coefficient R_SAT on the basis of the red color coordinate adjustment coefficient Rot_R, as shown in FIG. 10. As described above, as the hue average is closer to the central hue (of red, here), or the hue variance is smaller, the red color coordinate adjustment coefficient Rot_R becomes larger. Hence, as the hue average is closer to the central hue, or the hue variance is smaller, the red saturation adjustment coefficient R_SAT becomes smaller.

(2) The red pixel correction coefficient ΔR(n), the green pixel correction coefficient ΔG(n), and the blue pixel correction coefficient ΔB(n) are the same as those described in the calculation of the brightness adjustment coefficient. Thus, a detailed description thereof will be omitted.

Note that, each of the red pixel correction coefficient ΔR(n), the green pixel correction coefficient ΔG(n) and the blue pixel correction coefficient ΔB(n) is calculated for each of multiple pixels constituting an image (frame). Hence, the saturation adjustment coefficient (β(n)) is corrected for each of the multiple pixels constituting the image (frame).

The brightness adjuster 230 performs brightness adjustment processing for adjusting brightness components of the image input signal. Specifically, the brightness adjuster 230 adjusts the input brightness component $V_{in}$ for each pixel, on the basis of the brightness adjustment coefficient (α(n)). More specifically, the brightness adjuster 230 adjusts the input brightness component $V_{in}$ and calculates an output brightness component $V_{out}$ according to the following formula:

$$V_{out} = V_{in} + \alpha(n) \times V_{in}$$ [Formula 5]

The saturation adjuster 240 performs saturation adjustment processing for adjusting saturation components of the image input signal. Specifically, the saturation adjuster 240 adjusts the input saturation component $S_{in}$ for each pixel, on the basis of the saturation adjustment coefficient (β(n)). More specifically, the saturation adjuster 240 adjusts the input saturation component $S_{in}$ and calculates an output saturation component $S_{out}$ according to the following formula:

$$S_{out} = S_{in} + \beta(n) \times S_{in}$$ [Formula 6]

The HSV inversion processor 250 calculates a red input signal $R1_{in}$, a green input signal $G1_{in}$, and a blue input signal $B1_{in}$ each pixel. Specifically, the HSV inversion processor 250 calculates these signals of each pixel on the basis of the input hue component $H_{in}$, the output saturation component $S_{out}$ and the output brightness component $V_{out}$ according to the following formulae:

(1) When $S_{out} = 0$ [Formula 7]

$$R1_{in} = G1_{in} = B1_{in} = V_{out}$$

(2) When $S_{out} > 0$ $$H_i = \left\lfloor \frac{H_{out}}{60} \right\rfloor \bmod 6$$

$$F = \frac{H_{out}}{60} \cdot H_i$$

-continued $$M = V_{out}\left(1 - \frac{S_{out}}{SIG_{MAX}}\right)$$

$$N = V_{out}\left(1 - F \times \frac{S_{out}}{SIG_{MAX}}\right)$$

$$K = V_{out}\left(1 - (1-F) \times \frac{S_{out}}{SIG_{MAX}}\right)$$

if $H_i=0$ then $R1_{in}=V_{out}$, $G1_{in}=K$, $B1_{in}=M$
if $H_i=1$ then $R1_{in}=N$, $G1_{in}=V_{out}$, $B1_{in}=M$
if $H_i=2$ then $R1_{in}=M$, $G1_{in}=V_{out}$, $B1_{in}=K$
if $H_i=3$ then $R1_{in}=M$, $G1_{in}=N$, $B1_{in}=V_{out}$
if $H_i=4$ then $R1_{in}=K$, $G1_{in}=M$, $B1_{in}=V_{out}$
if $H_i=5$ then $R1_{in}=V_{out}$, $G1_{in}=M$, $B1_{in}=N$ where $SIG_{MAX}$ is the largest value of each component.

The color coordinate adjuster 260 performs color coordinate adjustment processing for adjusting color coordinates of the image input signal according to the color reproduction ranges of the liquid crystal panels 30. Specifically, the color coordinate adjuster 260 calculates the image output signal on the basis of the color coordinate adjustment coefficients. For example, the color coordinate adjuster 260 calculates the red output signal $R_{out}$, the green output signal $G_{out}$, and the blue output signal $B_{out}$ according to the following formula:

$$\begin{pmatrix} R_{Out} \\ G_{Out} \\ B_{Out} \end{pmatrix} = \begin{pmatrix} R1_{in} \\ G1_{in} \\ B1_{in} \end{pmatrix} + \begin{pmatrix} a \times \text{Rot\_R} & b \times \text{Rot\_G} & c \times \text{Rot\_B} \\ d \times \text{Rot\_R} & e \times \text{Rot\_G} & f \times \text{Rot\_B} \\ g \times \text{Rot\_R} & h \times \text{Rot\_G} & i \times \text{Rot\_B} \end{pmatrix} \times \begin{pmatrix} \Delta R \\ \Delta G \\ \Delta B \end{pmatrix}$$ [Formula 8]

Here, the parameters a to i are constants determined according to the color reproduction ranges of the liquid crystal panels 30.

The display element controller 270 controls the liquid crystal panels 30 on the basis of the image output signal calculated by the color coordinate adjuster 260.

(Advantages and Effects)

In the first embodiment, when the saturation of a pixel having the first hue (for example, a hue of red or green) is high, the coefficient controller 220 sets larger values for the red pixel correction coefficient ΔR(n) and the green pixel correction coefficient ΔG(n). In the calculation of the brightness adjustment coefficient (α(n)), the red pixel correction coefficient ΔR(n) and the green pixel correction coefficient ΔG(n) each have a "−" sign. Accordingly, the brightness adjustment coefficient (α(n)) results in a smaller value, and thereby the light component (input brightness component $V_{in}$) of the image input signal results in a smaller value. This reduces "glare" caused by the first hue (for example, the hue of red or green).

In the first embodiment, when the saturation of a pixel having the second hue (for example, a hue of blue) is high, the coefficient controller 220 sets a larger value for the blue pixel correction coefficient ΔB(n). In the calculation of the brightness adjustment coefficient (α(n)), the blue pixel correction coefficient ΔB(n) has a "+" sign. Accordingly, the brightness adjustment coefficient (α(n)) results in a larger value, and thereby the light component (input brightness component $V_{in}$) of the image input signal results in a larger value. This causes "color shifts" purposely, and thus reduces "glare" caused by the second hue (for example, the hue of blue).

In the first embodiment, as the hue average is close to the central hue, or the hue variance is larger, the color coordinate adjustment coefficient (the red color coordinate adjustment coefficient Rot_R, the green color coordinate adjustment coefficient Rot_G, or the blue color coordinate adjustment coefficient Rot_B) becomes smaller. In other words, a decreasing width of the color reproduction range is narrowed in the color coordinate adjustment processing performed by the color coordinate adjuster 260. Accordingly, the color reproduction ranges of the liquid crystal panels 30 can be effectively used in an image where glare or the like is less likely to occur.

In the first embodiment, the red brightness adjustment coefficient R_LUM has a trade-off relationship with the red color coordinate adjustment coefficient Rot_R. The green brightness adjustment coefficient G_LUM has a trade-off relationship with the green color coordinate adjustment coefficient Rot_G. The blue brightness adjustment coefficient B_LUM has a trade-off relationship with the blue color coordinate adjustment coefficient Rot_B. In other words, the brightness adjustment coefficient calculated on the basis of the red brightness adjustment coefficient R_LUM, the green brightness adjustment coefficient G_LUM, and the blue brightness adjustment coefficient B_LUM has a trade-off relationship with the color coordinate adjustment coefficient (the red color coordinate adjustment coefficient Rot_R, the green color coordinate adjustment coefficient Rot_G, or the blue color coordinate adjustment coefficient Rot_B).

Thereby, it is possible to achieve both of the effective use of the color reproduction ranges of the liquid crystal panels 30 and the reduction in "glare" caused by a pixel with high saturation.

In the first embodiment, the red saturation adjustment coefficient R_SAT has a trade-off relationship with the red color coordinate adjustment coefficient Rot_R. The green saturation adjustment coefficient G_SAT has a trade-off relationship with the green color coordinate adjustment coefficient Rot_G. The blue saturation adjustment coefficient B_SAT has a trade-off relationship with the blue color coordinate adjustment coefficient Rot_B. In other words, the saturation adjustment coefficient calculated on the basis of the red saturation adjustment coefficient R_SAT, the green saturation adjustment coefficient G_SAT, and the blue saturation adjustment coefficient B_SAT has a trade-off relationship with the color coordinate adjustment coefficient (the red color coordinate adjustment coefficient Rot_R, the green color coordinate adjustment coefficient Rot_G, or the blue color coordinate adjustment coefficient Rot_B).

Thereby, it is possible to achieve both of the effective use of the color reproduction ranges of the liquid crystal panels 30 and the reduction in "glare" caused by a pixel with high saturation.

[First Modified Embodiment]

Hereinafter, a first modified embodiment of the first embodiment will be described. The difference between the first modified embodiment and the first embodiment will be mainly described below.

Specifically, in the first embodiment, the parameters are provided for red, green and blue hues. On the other hand, in the first modified embodiment, parameters are provided for another hue (for example, a skin hue), in addition to the red, green and blue hues. In the first modified embodiment, the spin hue represents a third hue.

(Skin-color Color Coordinate Adjustment Coefficient)

A skin-color color coordinate adjustment coefficient Rot_S added in the first modified embodiment will be described below. Specifically, the skin-color color coordinate adjustment coefficient Rot_S is calculated on the basis of a hue average and a hue variance of pixels having a target hue. A region of the target hue to be used for calculation of the skin-color color coordinate adjustment coefficient Rot_S is a skin hue region. Here, the skin hue region is in a range of ±30° of the central hue of skin color, for example. The skin-color color coordinate adjustment coefficient Rot_S is in a range from MIN ($\geqq 0$) to MAX ($\leqq 1$).

Note that, a method of calculating the skin-color color coordinate adjustment coefficient Rot_S is the same as the method of calculating the red color coordinate adjustment coefficient Rot_R.

(Skin-color Brightness Adjustment Coefficient)

A skin-color brightness adjustment coefficient S_LUM added in the first modified embodiment will be described below. Specifically, the skin-color brightness adjustment coefficient S_LUM is calculated on the basis of the skin-color color coordinate adjustment coefficient Rot_S. As the skin-color color coordinate adjustment coefficient Rot_S is larger, the skin-color brightness adjustment coefficient S_LUM becomes smaller. The skin-color brightness adjustment coefficient S_LUM is in a range from MIN ($\geqq 0$) to MAX ($\leqq 1$). Note that, a sign "+" is added to the skin-color brightness adjustment coefficient S_LUM in calculation of the brightness adjustment coefficient.

Note that, a method of calculating the skin-color brightness adjustment coefficient S_LUM is the same as the method of calculating the red brightness adjustment coefficient R_LUM.

(Skin-color Saturation Adjustment Coefficient)

A skin-color saturation adjustment coefficient S_SAT added in the first modified embodiment will be described below. Specifically, the skin-color saturation adjustment coefficient S_SAT is calculated on the basis of the skin-color color coordinate adjustment coefficient Rot_S. As the skin-color color coordinate adjustment coefficient Rot_S is larger, the skin-color saturation adjustment coefficient S_SAT becomes smaller. The skin-color saturation adjustment coefficient S_SAT is in a range from MIN ($\geqq 0$) to MAX ($\leqq 1$). Note that, a sign "+" is added to the skin-color saturation adjustment coefficient S_SAT in calculation of the saturation adjustment coefficient.

Note that, a method of calculating the skin-color saturation adjustment coefficient S_SAT is the same as the method of calculating the red saturation adjustment coefficient R_SAT.

(Skin-color Pixel Correction Coefficient)

A skin-color pixel correction coefficient $\Delta S(n)$ added in the first modified embodiment will be described below. Specifically, the skin-color pixel correction coefficient $\Delta S(n)$ is calculated on the basis of the hue and saturation of a target pixel (n). Note that, the skin-color pixel correction coefficient $\Delta S(n)$ takes the smallest value (for example, "0") when the hue of the target pixel (n) is not included in a skin hue region. Here, the skin hue region is in a range of ±30° of the central hue of skin color, for example. The skin-color pixel correction coefficient $\Delta S(n)$ is in a range from MIN ($\geqq 0$) to MAX ($\leqq 1$).

Note that, a method of calculating the skin-color pixel correction coefficient $\Delta S(n)$ is the same as the method of calculating the red pixel correction coefficient $\Delta R(n)$.

(Calculation Methods)

Calculation methods changed with the addition of the parameter will be described. The main calculation methods are the same as those of the first embodiment, and thus a detailed description thereof will be omitted.

The brightness adjustment coefficient ($\alpha(n)$) is calculated according to the following formula.

$$\alpha(n) = \quad \text{[Formula 9]}$$

$$(\cdot R\_LUM - G\_LUM + B\_LUM + S\_LUM) \times \begin{pmatrix} \Delta R(n) \\ \Delta G(n) \\ \Delta B(n) \\ \Delta S(n) \end{pmatrix}$$

The saturation adjustment coefficient ($\beta(n)$) is calculated according to the following formula:

$$\beta(n) = (R\_SAT\ G\_SAT\ B\_SAT\ S\_SAT) \times \begin{pmatrix} \Delta R(n) \\ \Delta G(n) \\ \Delta B(n) \\ \Delta S(n) \end{pmatrix} \quad \text{[Formula 10]}$$

The image output signal is calculated according to the following formula:

$$\begin{pmatrix} R_{out} \\ G_{out} \\ B_{out} \end{pmatrix} = \begin{pmatrix} R1_{in} \\ G1_{in} \\ B1_{in} \end{pmatrix} + \quad \text{[Formula 11]}$$

$$\begin{pmatrix} a \times \text{Rot\_R} & b \times \text{Rot\_G} & c \times \text{Rot\_B} & j \times \text{Rot\_S} \\ d \times \text{Rot\_R} & e \times \text{Rot\_G} & f \times \text{Rot\_B} & k \times \text{Rot\_S} \\ g \times \text{Rot\_R} & h \times \text{Rot\_G} & i \times \text{Rot\_B} & l \times \text{Rot\_S} \end{pmatrix} \times$$

$$\begin{pmatrix} \Delta R(n) \\ \Delta G(n) \\ \Delta B(n) \\ \Delta S(n) \end{pmatrix}$$

[Second Embodiment]
(Functions of Projection Display Apparatus)

Figure 11:
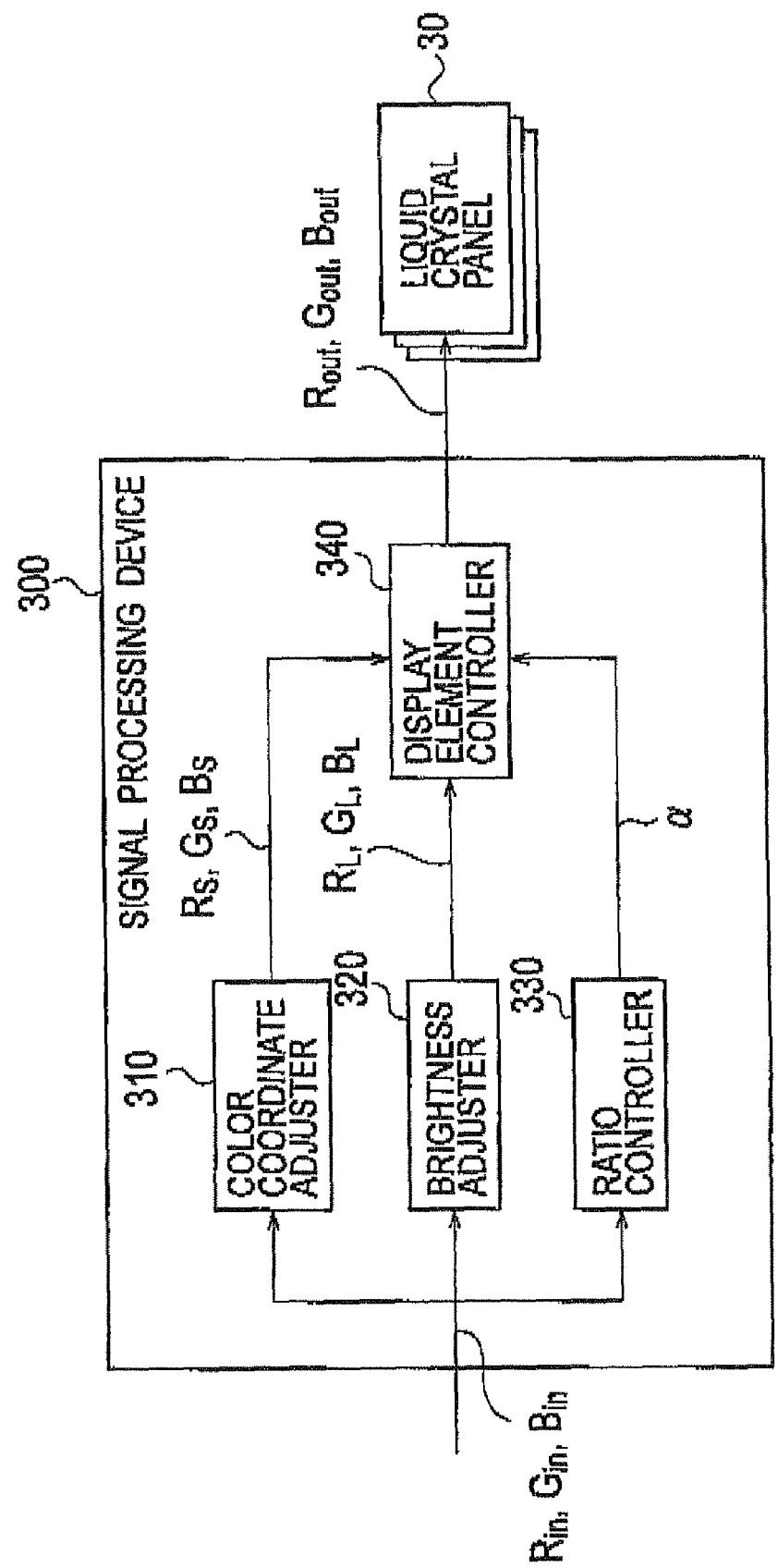
FIG. 11 is a block diagram showing a configuration of a signal processing device 300 according to a second embodiment.

Functions of the projection display apparatus according to the second embodiment will be described below with reference to the drawings. FIG. 11 is a block diagram showing functions of the projection display apparatus 100 (a signal processing device 300) according to the second embodiment.

The signal processing device 300 acquires an image input signal including a red input signal $R_{in}$, a green input signal $G_{in}$, and a blue input signal $B_{in}$. The signal processing device 300 outputs an image output signal including a red output signal $R_{out}$, a green output signal $G_{out}$, and a blue output signal $B_{out}$. Here, each of the red input signal $R_{in}$, the green input signal $G_{in}$, and the blue input signal $B_{in}$ has a value in a range from the smallest pixel value (for example, "0") to the largest pixel value (for example, "255"). Likewise, each of the red output signal $R_{out}$, the green output signal $G_{out}$, and the blue output signal $B_{out}$ has a value in a range from the smallest pixel value (for example, "0") to the largest pixel value (for example, "255").

As shown in FIG. 11, the signal processing device 300 includes a color coordinate adjuster 310, a brightness adjuster 320, a ratio controller 330, and display element controller 340.

The color coordinate adjuster 310 performs color coordinate adjustment processing for adjusting color coordinates of the image input signal according to difference of the color reproduction ranges between the liquid crystal panels 30 and the input device. The color coordinates is area inside a closed curve formed by a monochromatic light locus (or a spectrum locus) and a purple boundary. The color coordinate is defined by saturation and hue. Here, assuming that the color reproduction range of the input device is known. Therefore, the color coordinate adjuster 310 performs the color coordinate adjustment processing in accordance of the color reproduction range of the liquid crystal panel 30. The color coordinate adjustment processing is processing for narrowing the color coordinates of the image input signal, so as to suppress color shifts cause by the difference of the color reproduction range. Specifically, the color coordinate adjustment processing is processing for changing a position inside the closed curve, by adjusting saturation and hue.

For example, the color coordinate adjuster 310 performs the color coordinate adjustment processing according to following formula;

$$\begin{pmatrix} R_S \\ G_S \\ B_S \end{pmatrix} = \begin{pmatrix} a & b & c \\ d & e & f \\ g & h & i \end{pmatrix} \times \begin{pmatrix} R_{in} \\ G_{in} \\ B_{in} \end{pmatrix} \quad \text{[Formula 12]}$$

Here, $R_S$, $G_S$, and $B_S$ are color coordinate adjusted signals respectively corresponding to the red, green and blue. The parameters a to i are constants determined according to the color reproduction ranges of the liquid crystal panels 30.

The brightness adjuster 320 performs brightness adjustment processing for adjusting brightness components of the image input signal. The brightness adjustment processing is process for decreasing the brightness components of the image input signal so as to suppress a glare of a color having high saturation (purity).

For example, the brightness adjuster 320 performs the brightness adjustment processing according to following formula;

$$\begin{pmatrix} R_L \\ G_L \\ B_L \end{pmatrix} = Lum \times \begin{pmatrix} R_{in} \\ G_{in} \\ B_{in} \end{pmatrix} \quad \text{[Formula 13]}$$

Here, $R_L$, $G_L$, and $B_L$ are brightness adjusted signals respectively corresponding to the red, green and blue. The parameter Lum is constant which defines a decrease amount of the brightness component of the image input signal. The parameter Lum has a value in a range from the smallest value to the largest value (for example "1"). The smallest value is a value in a range from 0 to 1. The brightness component of the image input signal increases, as the parameter Lum gets smaller.

The ratio controller 330 controls a color coordinate contribution degree and a brightness component contribution degree. The color coordinate contribution degree indicates a degree that the color coordinate adjustment processing influences the image output signal. The brightness component contribution degree indicates a degree that the brightness adjustment processing influences the image output signal.

Here, the ratio controller 330 controls the color coordinate contribution degree ($1-\alpha$) and the brightness component contribution degree ($\alpha$), based on the hue and the saturation of the image input signal. The parameter a has a value in a range from 0 to 1.

Specifically, the ratio controller 330 acquires the hue and the saturation of the image input signal for each pixel. The ratio controller 330 counts, by use of a determining counter, the number of pixels having the saturation exceeding a predetermined threshold in a first specific hue (here, red hue) or a second specific hue (here, green hue).

Figure 12:
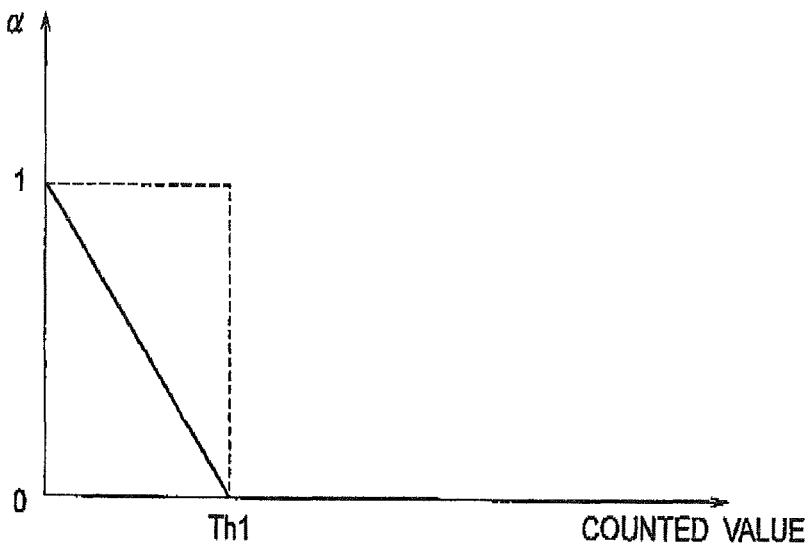
FIG. 12 is a graph showing a parameter α according to the second embodiment.

As shown in FIG. 12, the ratio controller 330 decreases the parameter α, till the counted value of the determining counter reaches a first threshold. On the contrary, the ratio controller 330 keeps the parameter α at the minimum value (=0), after the counted value of the determining counter exceeds the first threshold. The parameter α has a value in a range from 0 to 1.

The display element controller 340 acquires the image output signal, based on the color coordinates adjusted by the color coordinate adjustor 310 and the brightness component adjusted by the brightness adjustor 320. the display element controller 340 controls a control ratio of the color coordinate adjusted signals and the brightness adjusted signals, according to the parameter α acquired from the ratio controller 330.

For example, the display element controller 340 acquires the image output signals according to following formula;

$$\begin{pmatrix} R_{out} \\ G_{out} \\ B_{out} \end{pmatrix} = (1-\alpha) \times \begin{pmatrix} R_S \\ G_S \\ B_S \end{pmatrix} + \alpha \times \begin{pmatrix} R_L \\ G_L \\ B_L \end{pmatrix}$$  [Formula 14]

(Operation of Projection Display Apparatus)

Figure 13:
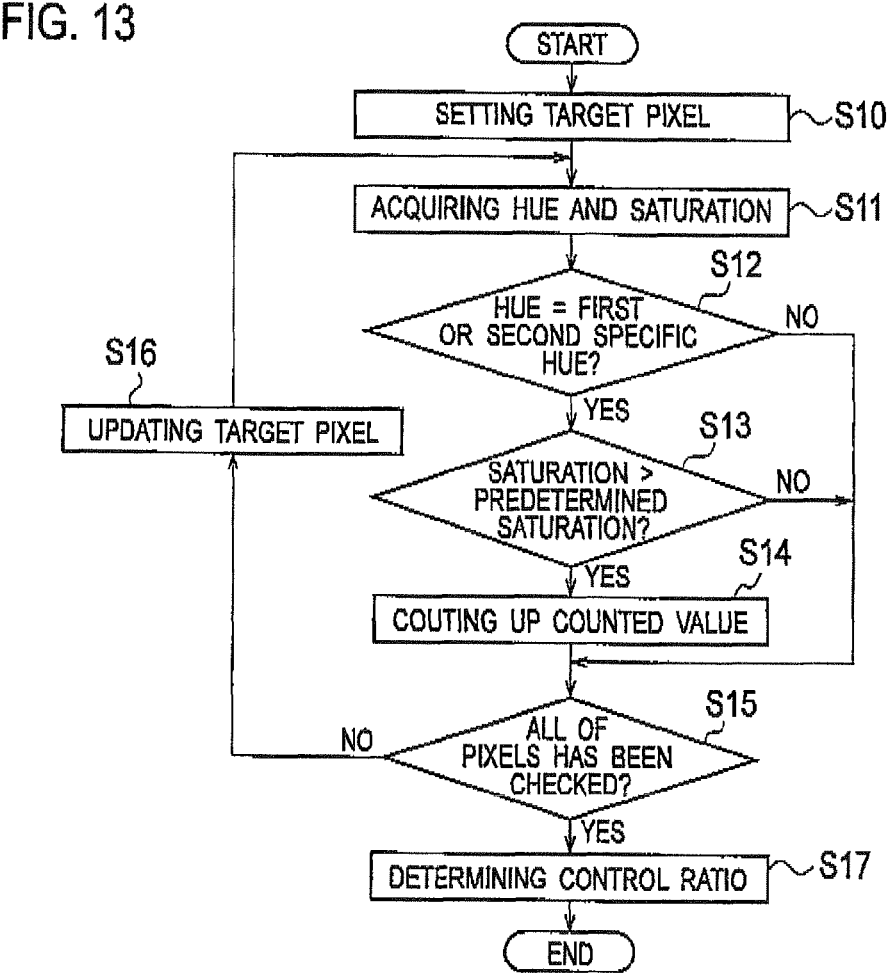
FIG. 13 is a flowchart showing an operation of the signal processing device 300 according to the second embodiment.

Operation of the projection display apparatus according to the second embodiment will be described below with reference to the drawing. FIG. 13 is a flowchart showing an operation of the projection display apparatus 100 (the signal processing device 300) according to the second embodiment.

As shown in FIG. 13, in Step 10, the signal processing device 300 sets a target pixel from among the multiple pixels forming the image (frame).

In Step 11, the signal processing device 300 acquires a hue and a saturation of the target pixel, based on the image input signal of the target pixel.

In Step 12, the signal processing device 300 determines whether the hue acquired in Step 11 is included in the first specific hue (here, the red hue) or the second specific hue (here, the green hue). The signal processing device 300 proceeds to Step 13 when the hue is included in the specific hue. On the contrary, the signal processing device 300 proceeds to Step 15, when the hue is not included in the specific hue.

In Step 13, the signal processing device 300 determines whether the saturation acquired in Step 11 exceeds the predetermined threshold. The signal processing device 300 proceeds to Step 14, when the saturation exceeds the predetermined threshold. On the contrary, the signal processing device 300 proceeds to Step 15, when the saturation not exceeds the predetermined threshold.

In Step 14, the signal processing device 300 counts up the counted value of the determining counter. Specifically, the signal processing device 300 adds "1" to the counted value of the determining counter.

In Step 15, the signal processing device 300 determines whether all of the pixels forming the image (frame) have been checked. The signal processing device 300 proceeds to Step 17, when the all of the pixels have been checked. On the contrary, the signal processing device 300 proceeds to Step 16, when the all of the pixels have not been checked.

In Step 16, the signal processing device 300 updates the target pixel. For example, the signal processing device 300 shifts the target pixel in the horizontal direction or the vertical direction.

In Step 17, the signal processing device 300 determines the control ratio α (1-α) of the brightness component contribution degree (the color coordinate contribution degree). Specifically, the signal processing device 300 determines the control ratio α (1-α) according to the counted value of the determining counter.

(Advantages and Effects)

In the second embodiment, the ratio controller 330 increases the color coordinate contribution degree and decreases the brightness component contribution degree, in the case where the saturation of the image input signal is higher than the predetermined threshold in the first specific hue (the red hue, for example) or the second specific hue (the green hue, for example), that is, in the case where a difference between a color coordinates of an image and a color coordinates of an actual object is large.

Accordingly, the difference between the color coordinates of the image and the color coordinates of the actual object may be suppressed, when the difference between the color coordinates of the image and the color coordinates of the actual object is large.

On the contrary, the ratio controller 330 decreases the color coordinate contribution degree and increases the brightness component contribution degree, in the case where the saturation of the image input signal is lower than the predetermined threshold in the first specific hue (the red hue, for example) or the second specific hue (the green hue, for example), that is, in the case where the difference between the color coordinates of the image and the color coordinates of the actual object is small.

Accordingly, the color reproduction range of the liquid crystal panel may be effectively utilized, when the difference between the color coordinates of the image and the color coordinates of the actual object is small.

[First Modified Embodiments]

Hereinafter, a first modified embodiment of the second embodiment will be described. The difference between the first modified embodiment and the second embodiment will be mainly described below.

Specifically, the parameter Lum used for the brightness adjustment processing is constant, according to the second embodiment. On the other hand, the parameter Lum used for the brightness adjustment processing is determined based on an average brightness of multiple pixels forming an image (a frame), according to the first modified embodiment.

(Functions of Projection Display Apparatus)

Figure 14:
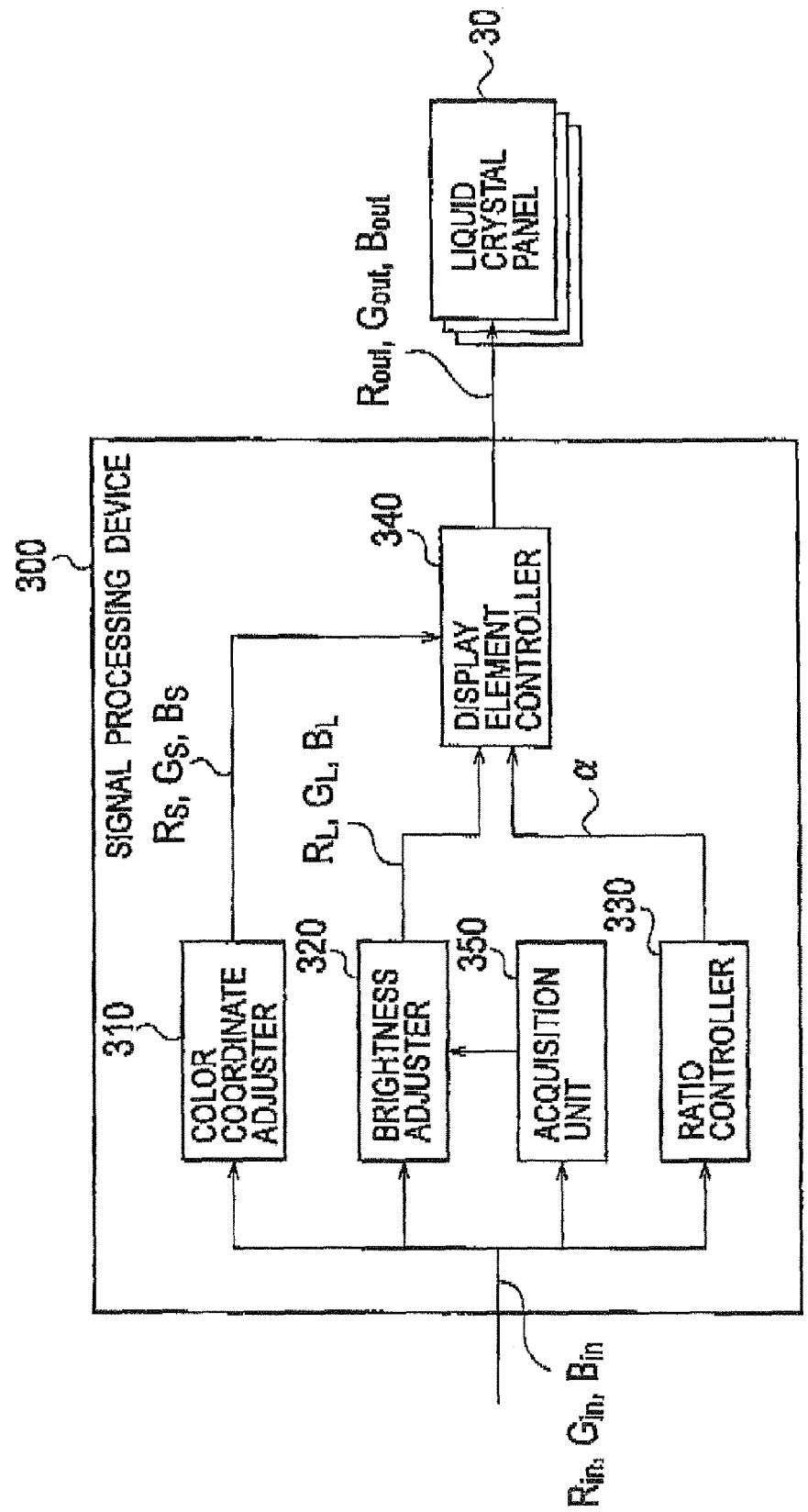
FIG. 14 is a block diagram showing a configuration of a signal processing device 300 according to a first modified embodiment of the second embodiment.

Functions of the projection display apparatus according to the first modified embodiment will be described below with reference to the drawings. FIG. 14 is a block diagram showing functions of the projection display apparatus 100 (a signal processing device 300) according to the first modified embodiment. Note that, in the FIG. 14, the same constitutions with FIG. 11 are denoted by the same reference numerals.

As shown in FIG. 14, the signal processing device 300 includes an acquisition unit 350 in addition to the constitutions shown in FIG. 11. The acquisition unit 350 acquires an average brightness of multiple pixels forming an image (a frame) according to the image input signal.

(Parameter Lum)

Figure 15:
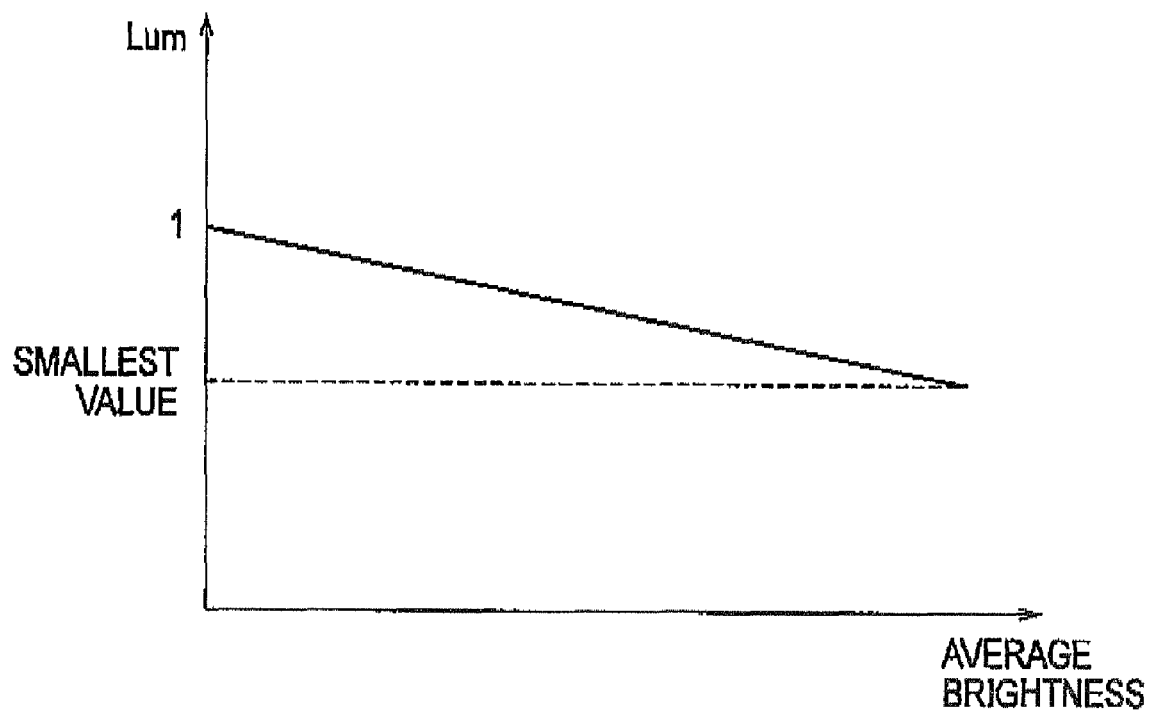
FIG. 15 is a graph showing a parameter Lum according to the first modified embodiment of the second embodiment.

A parameter Lum according to the first modified embodiment will be described below with the drawings. FIG. 15 is a graph showing a parameter Lum according to the first modified embodiment.

As shown in FIG. 15, the above described brightness adjustor 320 determines the parameter Lum, according to the average brightness of the multiple pixels forming the image (frame). Specifically, the brightness adjustor 320 determines smaller value for the parameter Lum, as the average brightness gets higher. That is, the brightness adjustor 320 increases a decreasing amount of the brightness component of the image input signal, as the average brightness gets higher.

Note that, the parameter Lum has a value in a range from the smallest value to the largest value (for example "1"), similar to the second embodiment. The smallest value is a value in a range from 0 to 1.

(Advantages and Effects)

In the first modified embodiment, the brightness adjustor 320 determines smaller value for the parameter Lum, as the average brightness gets higher. That is, the brightness adjustor 320 increases the decreasing amount of the brightness component of the image input signal, when the image has high luminance tends to cause the glare. On the contrary, the brightness adjustor 320 decreases the decreasing amount of the brightness component of the image input signal, when the image has low luminance hardly causing the glare. Accordingly, the glare may be suppressed, while improving the brightness for some extent.

[Second Modified Embodiment]

Hereinafter, a second modified embodiment of the second embodiment will be described. The difference between the second modified embodiment and the second embodiment will be mainly described below.

Specifically, the control ratio ($\alpha$) of the brightness component contribution degree in the second embodiment is determined according to the counted value of determining counter. On the contrary, a control ratio ($\beta$) of the brightness component contribution degree in the second modified embodiment is determined according to a hue gain $GAIN_{H(m,n)}$ and a saturation gain $GAIN_{S(m,n)}$ acquired for each pixel.

(Functions of Projection Display Apparatus)

Figure 16:
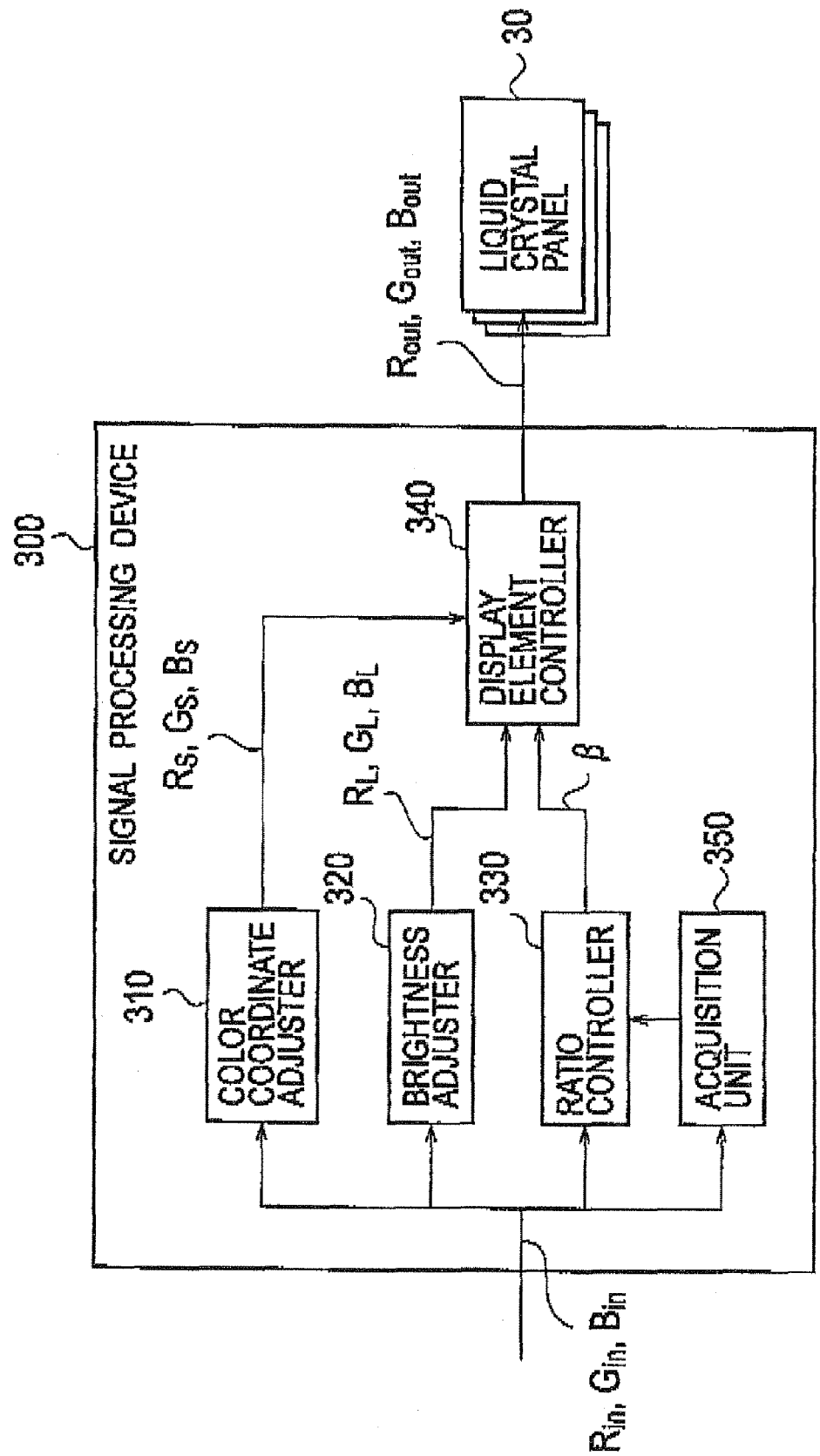
FIG. 16 is a block diagram showing a configuration of a signal processing device 300 according to a second modified embodiment of the second embodiment.

Functions of the projection display apparatus according to the second modified embodiment will be described below with reference to the drawings. FIG. 16 is a block diagram showing functions of the projection display apparatus 100 (a signal processing device 300) according to the second modified embodiment. Note that, in the FIG. 16, the same constitutions with FIG. 11 are denoted by the same reference numerals.

As shown in FIG. 16, the signal processing device 300 includes an acquisition unit 350 in addition to the constitutions shown in FIG. 11.

The acquisition unit 350 acquires various values according to the image input signal. Specifically, the acquisition unit 350 acquires (1) a hue of a pixel (m,n) forming the image (frame), and (2) a saturation of pixel (m,n) forming the image (frame).

Here, the above described ratio controller 330 acquires the parameter $\alpha_{(m,n)}$ corresponding to the pixel (m,n) according to the hue and the saturation.

Figure 17:
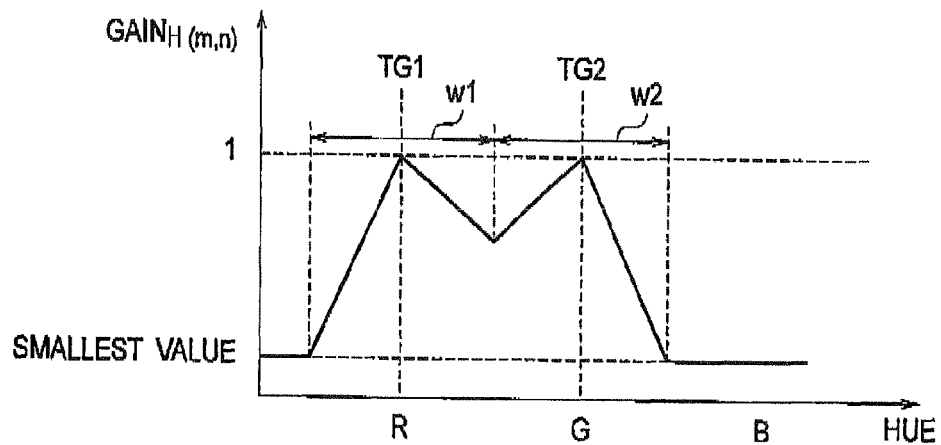
FIG. 17 is a graph showing a hue gain ($GAIN_{H(m,n)}$) according to the second modified embodiment of the second embodiment.

Specifically, as shown in FIG. 17, the ratio controller 330 acquires the hue gain $GAIN_{H(m,n)}$, according to the hue of the pixel (m,n). Here, the first specific hue (the red hue, for example) has a first hue range $\omega 1$ including a first target hue TG1. Moreover, the second specific hue (the green hue, for example) has a second hue range $\omega 2$ including a second target hue TG2. The hue gain $GAIN_{H(m,n)}$ has larger value, as the hue is closer to the first target hue TG1 or the second target hue TG2. Note that, the hue gain $GAIN_{H(m,n)}$ has a value in a range from the smallest value (0 to 1) to 1.

Figure 18:
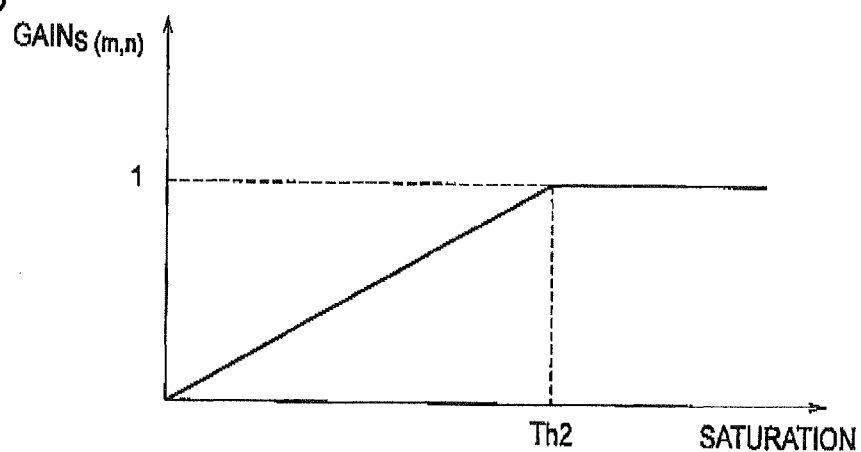
FIG. 18 is a graph showing a saturation gain ($GAIN_{S(m,n)}$) according to the second modified embodiment of the second embodiment.

As shown in FIG. 18, the ratio controller 330 acquires the saturation gain $GAIN_{S(m,n)}$, according to the saturation of the pixel (m,n). Here, the saturation gain $GAIN_{S(m,n)}$ has larger value as the saturation gets higher, till the saturation reaches a second threshold Th2. On the contrary, the saturation gain $GAIN_{S(m,n)}$ is kept at the largest value (1) after the saturation exceeds the second threshold Th2. Note that, the saturation gain $GAIN_{S(m,n)}$ has a value in a range from 0 to 1.

The ratio controller 330 acquires the parameter ($\alpha_{(m,n)}$) corresponding to the pixel (m,n), according to the hue gain $GAIN_{H(m,n)}$ and the saturation gain $GAIN_{S(m,n)}$. For example, the ratio controller 330 acquires the parameter ($\alpha_{(m,n)}$) according to following formula;

$$\alpha_{(m,n)} = GAIN_{H(m,n)} \times GAIN_{S(m,n)} \quad \text{[Formula 15]}$$

Subsequently, the ratio controller 330 acquires a total value (TOTAL$\alpha$), by sum up parameter $\alpha_{(m,n)}$ of all the pixels forming the image (frame). That is, the ratio controller 330 acquires a total value (TOTAL$\alpha$), according to following formula;

$$TOTAL\alpha = \sum_{m=1,n=1}^{MN} \alpha(m, n) \quad \text{[Formula 16]}$$

Here, M and N are maximum value of m and n.

Figure 19:
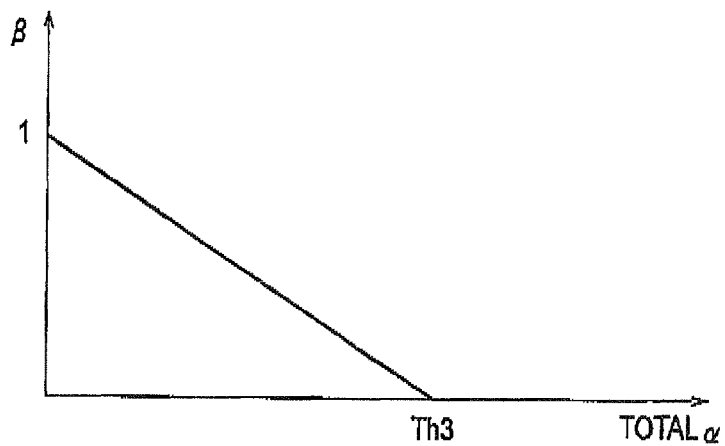
FIG. 19 is a graph showing a parameter β according to the second modified embodiment of the second embodiment.

As shown in FIG. 19, the ratio controller 330 acquires a parameter $\beta$ for the entire image (frame), according to the total value (TOTAL$\alpha$). The parameter $\beta$ has smaller value, as the total value (TOTAL$\alpha$) gets larger, till the total value (TOTAL$\alpha$) reaches a third threshold Th3. Moreover, the parameter $\beta$ is kept at smallest value (=0) after the total value (TOTAL$\alpha$) exceeds the third threshold Th3. Note that, the parameter $\beta$ has a value in a range from 0 to 1.

Therefore, the ratio controller 330 increases the color coordinate contribution degree and decreases the brightness component contribution degree, as the hue is closer to the first target hue TG1 or the second target hue TG2. Moreover, the ratio controller 330 increases the color coordinate contribution degree and decreases the brightness component contribution degree, as the saturation gets higher.

The display element controller 340 controls, for the entire image (frame), the ratio between the color coordinate adjusted signals and the brightness adjusted signals, according to the parameter $\beta$.

For example, the display element controller 340 acquires the image output signal, according to following formula;

$$\begin{pmatrix} R_{out} \\ G_{out} \\ B_{out} \end{pmatrix} = (1-\beta) \times \begin{pmatrix} R_S \\ G_S \\ B_S \end{pmatrix} + \beta \times \begin{pmatrix} R_L \\ G_L \\ B_L \end{pmatrix} \quad \text{[Formula 17]}$$

(Advantages and Effects)

In the second modified embodiment, the ratio controller 330 increases the color coordinate contribution degree and decreases the brightness component contribution degree, as the hue is closer to the first target hue TG1 or the second target hue TG2. Accordingly, the difference between the color coordinates of the image and the color coordinates of the actual object may be further suppressed, regarding the pixel having the hue close to the first target hue TG1 or the second target hue TG2.

Moreover, the ratio controller 330 increases the color coordinate contribution degree and decreases the brightness component contribution degree, as the saturation gets higher. Accordingly, the difference between the color coordinates of the image and the color coordinates of the actual object may be further suppressed, regarding the pixel having high saturation (purity).

[Third Modified Embodiment]

Hereinafter, a third modified embodiment of the second embodiment will be described. The difference between the third modified embodiment and the second embodiment will be mainly described below.

Specifically, the control ratio ($\alpha$) of the brightness component contribution degree in the second embodiment is determined according to the counted value of determining counter. On the contrary, a control ratio ($\gamma$) of the brightness component contribution degree in the third modified embodiment is determined according to a hue distribution $RANGE_H$ and a saturation distribution range $RANGE_S$ acquired for the entire image (frame).

(Functions of Projection Display Apparatus)

Figure 20:
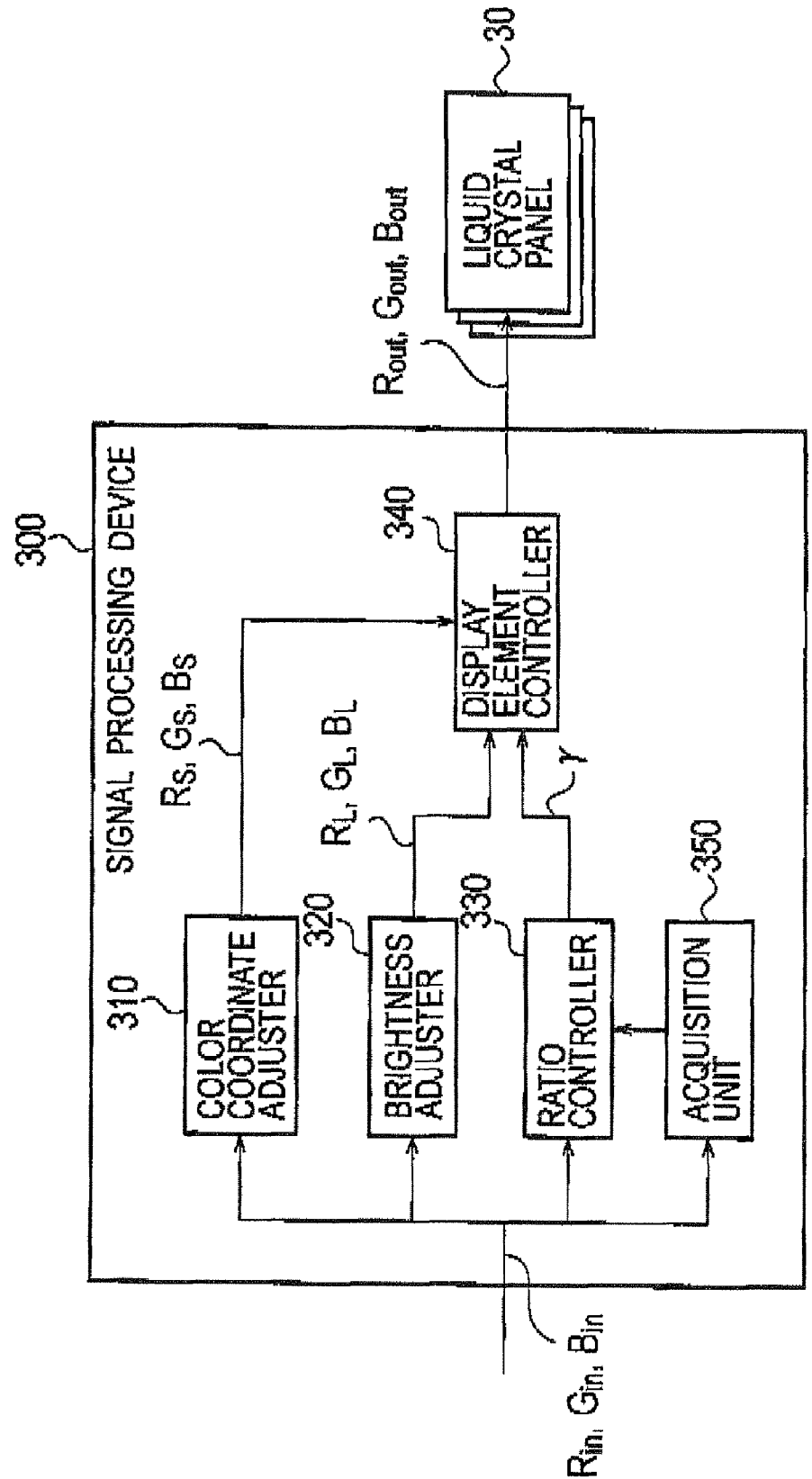
FIG. 20 is a block diagram showing a configuration of a signal processing device 300 according to a third modified embodiment of the second embodiment.

Functions of the projection display apparatus according to the third modified embodiment will be described below with reference to the drawings. FIG. 20 is a block diagram showing functions of the projection display apparatus 100 (a signal processing device 300) according to the third modified embodiment. Note that, in the FIG. 20, the same constitutions with FIG. 11 are denoted by the same reference numerals.

As shown in FIG. 20, the signal processing device 300 includes an acquisition unit 350 in addition to the constitutions shown in FIG. 11.

The acquisition unit 350 acquires various values according to the image input signal. Specifically, the acquisition unit 350 acquires (1) a hue of a pixel (m,n) forming the image (frame), and (2) a saturation of pixel (m,n) forming the image (frame).

Here, the above described ratio controller 330 acquires the parameter ($\gamma$) for the entire image (frame), according to the hue distribution $RANGE_H$ and the saturation distribution range $RANGE_S$ in the first specific hue (here, the red hue) and the second specific hue (here, the green hue). The hue distribution range $RANGE_H$ indicates a range of the hue in the first specific hue and the second specific hue acquired by acquisition unit 350. The saturation distribution range $RANGE_S$ indicates a range of the saturation in the first specific hue and the second specific hue acquired by acquisition unit 350.

Figure 21:
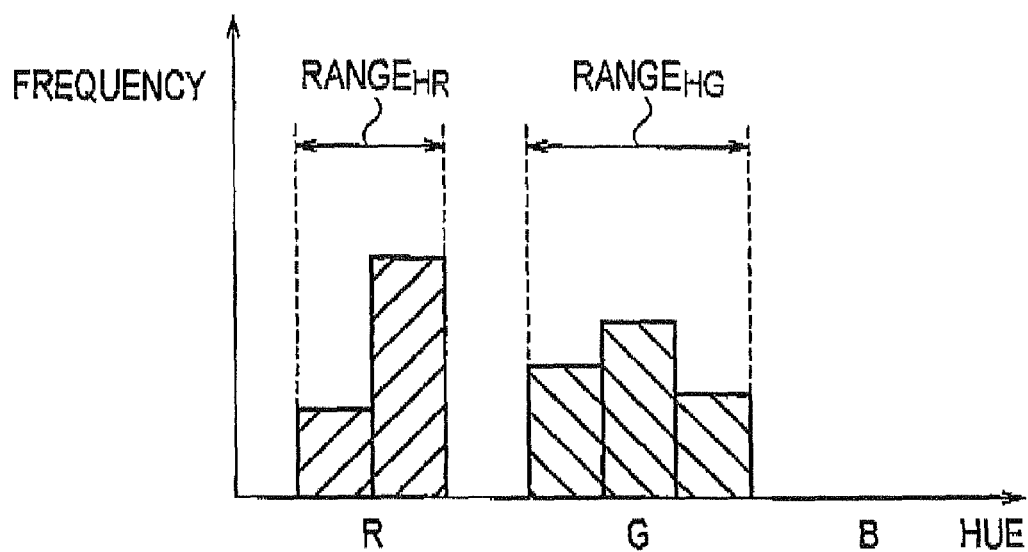
FIG. 21 is a graph showing a hue distribution range ($RANGE_{H(m,n)}$) according to the third modified embodiment of the second embodiment.

For example, as shown in FIG. 21, the ratio controller 330 may acquire the hue distribution $RANGE_H$ by constructing a histogram of the hue acquired by the acquired by acquisition unit 350. The hue distribution $RANGE_H$ is sum of the first hue distribution $RANGE_{HR}$ and the second hue distribution $RANGE_{HG}$.

Figure 22:
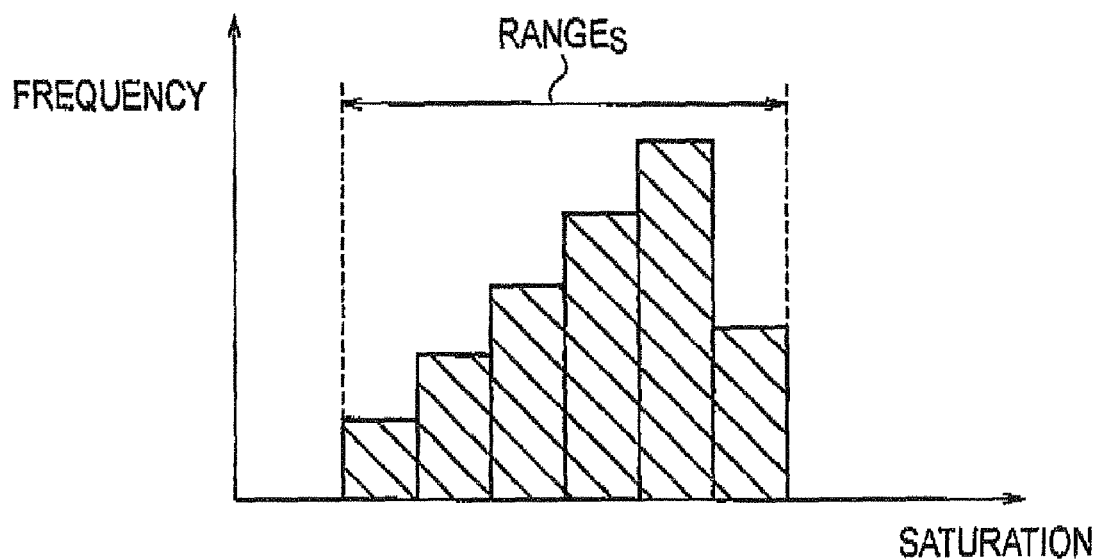
FIG. 22 is a graph showing a saturation distribution range ($RANGE_{S(m,n)}$) according to the third modified embodiment of the second embodiment.

For example, as shown in FIG. 22, the ratio controller 330 may acquire the saturation distribution range $RANGE_S$ by constructing a histogram of the saturation acquired by the acquired by acquisition unit 350.

Figure 23:
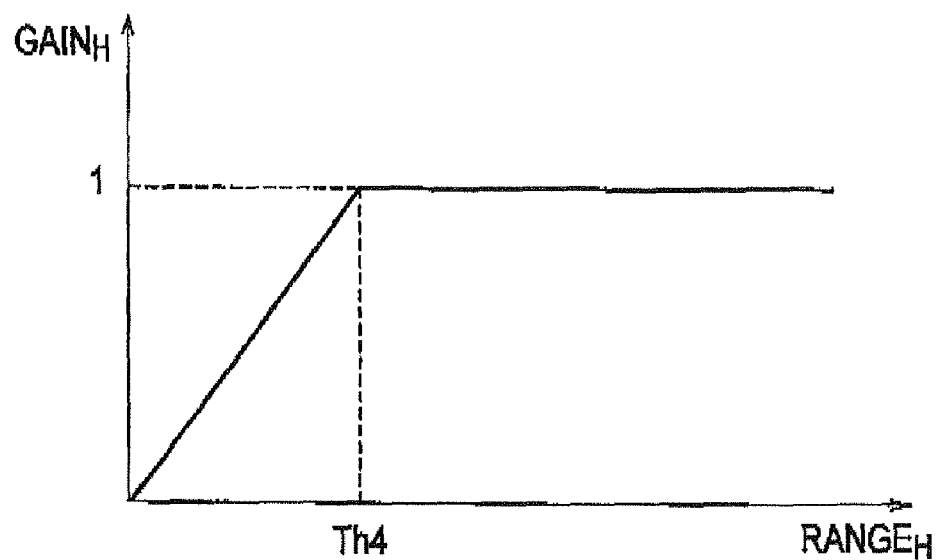
FIG. 23 is a graph showing a hue gain ($GAIN_H$) according to the third modified embodiment of the second embodiment.

Consequently, as shown in FIG. 23, the ratio controller 330 acquires the hue gain $GAIN_H$ according to the hue distribution $RANGE_H$. The hue gain $GAIN_H$ has larger value, as the hue distribution $RANGE_H$ gets wider, till the hue distribution $RANGE_H$ reaches a fourth threshold. On the contrary, the hue gain $GAIN_H$ is kept at the largest value (=1), after the hue distribution $RANGE_h$ exceeds the fourth threshold. Note that, the hue gain $GAIN_H$ has a value in a range from 0 to 1.

Figure 24:
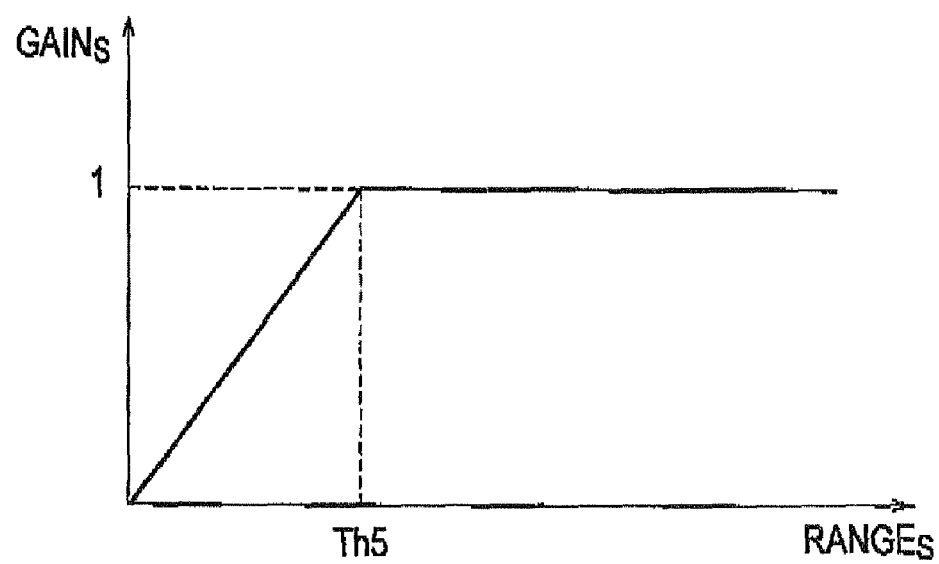
FIG. 24 is a graph showing a saturation gain ($GAIN_S$) according to the third modified embodiment of the second embodiment.

As shown in FIG. 24, the ratio controller 330 acquires the saturation gain $GAIN_S$ according to the saturation distribution range $RANGE_S$. The saturation gain $GAIN_S$ has larger value, as the saturation distribution range $RANGE_S$ gets wider, till the saturation distribution range $RANGE_S$ reaches a fifth threshold Th5. On the contrary, the saturation gain $GAIN_S$ is kept at the largest value (=1), after the saturation distribution range $RANGE_S$ exceeds the fifth threshold Th5. Note that, the saturation gain $GAIN_S$ has a value in a range from 0 to 1.

Next, the ratio controller 330 acquires the parameter $\gamma$ corresponding to the entire image (frame), according to the hue gain $GAIN_H$ and the saturation gain $GAIN_S$. For example, the ratio controller 330 acquires the parameter $\gamma$ according to following formula;

$$\gamma = GAIN_H \times GAIN_S \qquad \text{[formula 18]}$$

Therefore, the ratio controller 330 increases the brightness component contribution degree and decreases the color coordinate contribution degree, as the hue distribution $RANGE_H$ gets wider. Moreover, the ratio controller 330 increases the brightness component contribution degree and decreases the color coordinate contribution degree, as the saturation distribution range $RANGE_S$ gets wider.

The display element controller 340 controls, for the entire image (frame), the ratio between the color coordinate adjusted signals and the brightness adjusted signals, according to the parameter $\gamma$.

For example, the display element controller 340 acquires the image output signal, according to following formula;

$$\begin{pmatrix} R_{out} \\ G_{out} \\ B_{out} \end{pmatrix} = (1-\gamma) \times \begin{pmatrix} R_S \\ G_S \\ B_S \end{pmatrix} + \gamma \times \begin{pmatrix} R_L \\ G_L \\ B_L \end{pmatrix} \qquad \text{[Formula 19]}$$

(Advantages and Effects)

In the third modified embodiment, the ratio controller 330 acquires the parameter $\gamma$ corresponding to the entire image (frame), according to the hue gain $GAIN_H$ and the saturation gain $GAIN_S$.

Specifically, the ratio controller 330 increases the brightness component contribution degree and decreases the color coordinate contribution degree, as the hue distribution $RANGE_H$ in the first specific hue (here, the red hue) and the second specific hue (here, the green hue) gets wider. Accordingly, a reduction of a hue difference between the pixels may be suppressed in the first specific hue and the second specific hue. Therefore, an occurrence of losing a gradation of color may be suppressed.

Moreover, the ratio controller 330 increases the brightness component contribution degree and decreases the color coordinate contribution degree, as saturation distribution range $RANGE_S$ in the first specific hue (here, the red hue) and the second specific hue (here, the green hue) gets wider. Accordingly, a reduction of a saturation difference between the pixels may be suppressed in the first specific hue and the second specific hue. Therefore, an occurrence of losing a gradation of color may be suppressed.

[Fourth Modified Embodiment]

Hereinafter, a fourth modified embodiment of the second embodiment will be described. The difference between the fourth modified embodiment and the second embodiment will be mainly described below.

Specifically, the control ratio ($\alpha$) of the brightness component contribution degree in the second embodiment is determined according to the counted value of determining counter. On the contrary, a control ratio ($\alpha_{(m,n)}$) of the brightness component contribution degree in the fourth modified embodiment is determined according to a brightness gain $GAIN_{L(m,n)}$, a hue gain $GAIN_{H(m,n)}$, and a saturation gain $GAIN_{S(m,n)}$ acquired for each pixels.

(Functions of Projection Display Apparatus)

Figure 25:
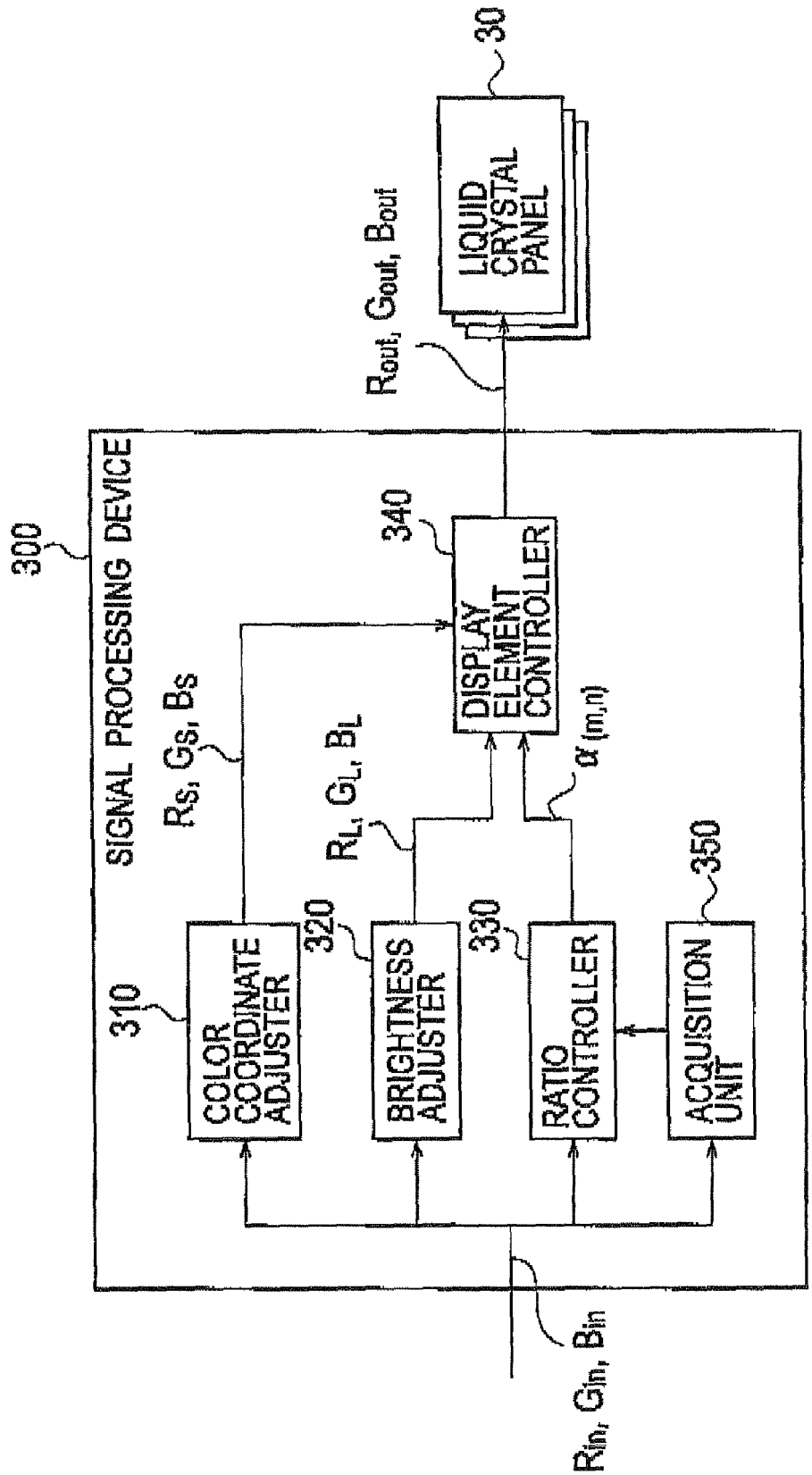
FIG. 25 is a block diagram showing a configuration of a signal processing device 300 according to a fourth modified embodiment of the second embodiment.

Functions of the projection display apparatus according to the fourth modified embodiment will be described below with reference to the drawings. FIG. 25 is a block diagram showing functions of the projection display apparatus 100 (a signal processing device 300) according to the fourth modified embodiment. Note that, in the FIG. 25, the same constitutions with FIG. 11 are denoted by the same reference numerals.

As shown in FIG. 25, the signal processing device 300 includes an acquisition unit 350 in addition to the constitutions shown in FIG. 11.

The acquisition unit 350 acquires various values according to the image input signal. Specifically, the acquisition unit 350 acquires (1) a brightness of a pixel (m,n) forming the image (frame), (2) a hue of a pixel (m,n) forming the image (frame), and (3) a saturation of pixel (m,n) forming the image (frame).

Here, the above described ratio controller 330 acquires the parameter $\alpha_{(m,n)}$ corresponding to the pixel (m,n) according to the brightness, the hue and the saturation.

Figure 26:
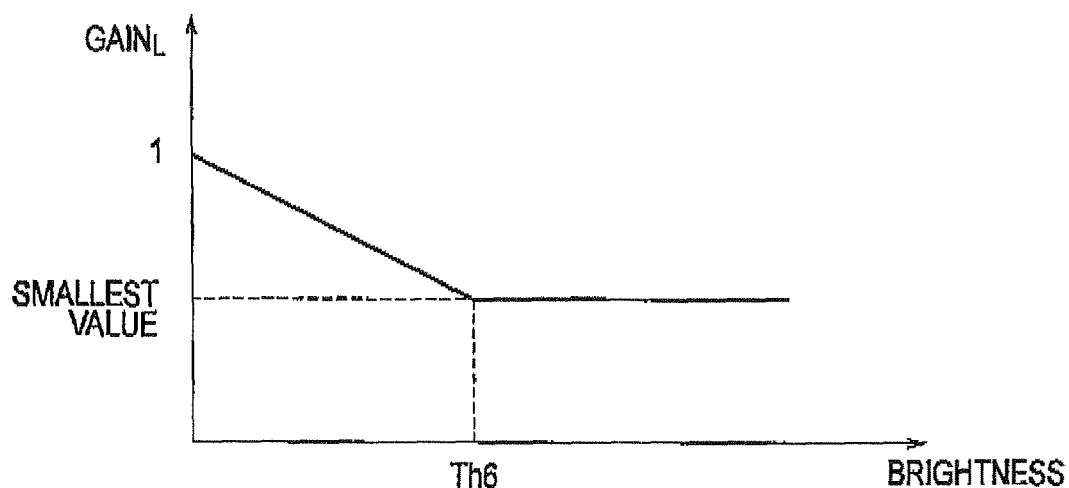
FIG. 26 is a graph showing a brightness gain ($GAIN_{L(m,n)}$) according to the fourth modified embodiment of the second embodiment.

Specifically, as shown in FIG. 26, the ratio controller 330 acquires the brightness gain $GAIN_{L(m,n)}$, according to the brightness of the pixel (m,n). The brightness gain $GAIN_{L(m,n)}$ has smaller value, as the brightness gets higher, till the brightness reaches the sixth threshold Th6. On the contrary, the brightness gain $GAIN_{L(m,n)}$ is kept at the smallest value after the brightness exceeds the sixth threshold Th6. Note that, the brightness gain $GAIN_{L(m,n)}$ has a value in a range from the smallest value to the largest value (for example "1"). The smallest value is a value in a range from 0 to 1.

Figure 27:
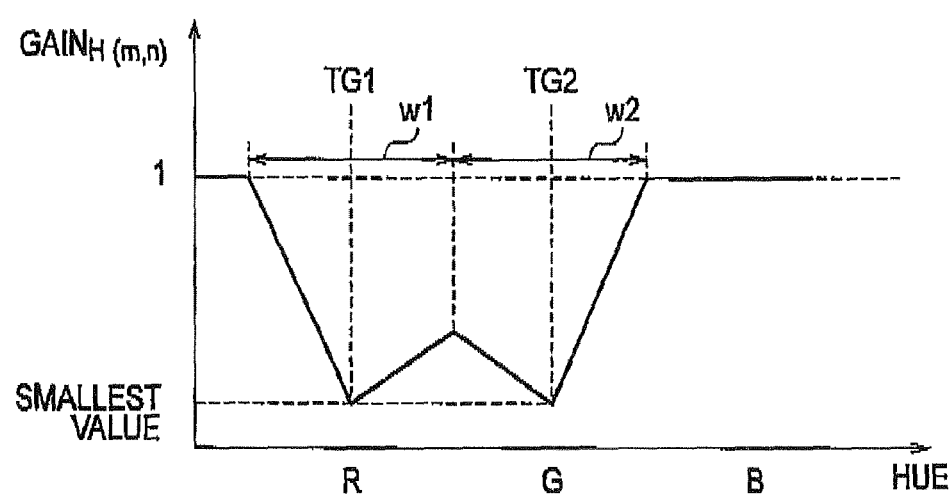
FIG. 27 is a graph showing a hue gain ($GAIN_{H(m,n)}$) according to the fourth modified embodiment of the second embodiment.

As shown in FIG. 27, the ratio controller 330 acquires the hue gain $GAIN_{H(m,n)}$, according to the hue of the pixel (m,n). Here, the first specific hue (the red hue, for example) has a first hue range ω1 including a first target hue TG1. Moreover, the second specific hue (the green hue, for example) has a second hue range ω2 including a second target hue TG2. The hue gain $GAIN_{H(m,n)}$ has smaller value, as the hue is closer to the first target hue TG1 or the second target hue TG2. The hue gain $GAIN_{H(m,n)}$ has the smallest value when the hue is equal to the first target hue TG1 or the second target hue TG2. Note that, the hue gain $GAIN_{H(m,n)}$ has a value in a range from the smallest value (0 to 1) to 1.

Figure 28:
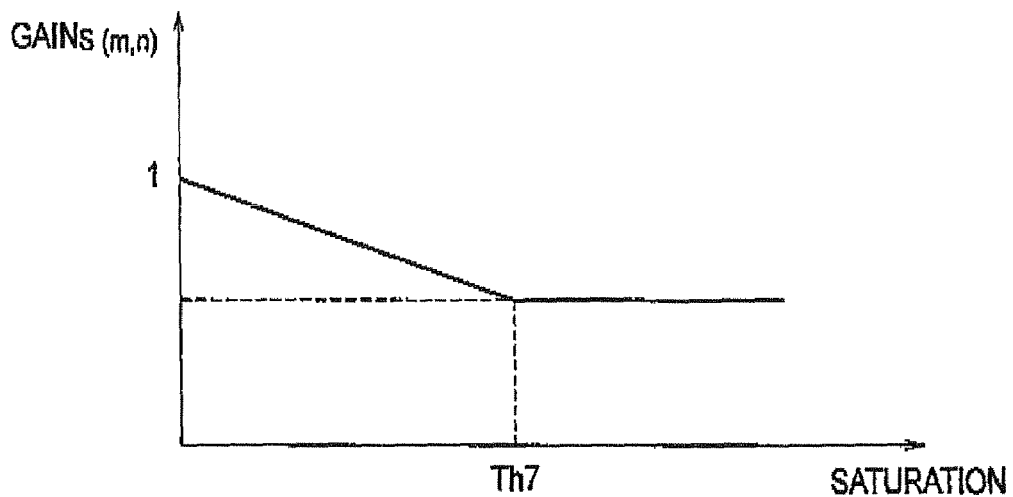
FIG. 28 is a graph showing a saturation gain ($GAIN_{S(m,n)}$) according to the fourth modified embodiment of the second embodiment.

As shown in FIG. 28, the ratio controller 330 acquires the saturation gain $GAIN_{S(m,n)}$, according to the saturation of the pixel (m,n). Here, the saturation gain $GAIN_{S(m,n)}$ has smaller value as the saturation gets higher, till the saturation reaches a seventh threshold Th7. On the contrary, the saturation gain $GAIN_{S(m,n)}$ is kept at the smallest value after the saturation exceeds the seventh threshold Th7. Note that, the saturation gain $GAIN_{S(m,n)}$ has a value in a range from the smallest value (0 to 1) to 1.

Consequently, the ratio controller 330 acquires the parameter ($\alpha_{(m,n)}$) corresponding to the pixel (m,n), according to the brightness gain $GAIN_{L(m,n)}$, the hue gain $GAIN_{H(m,n)}$ and the saturation gain $GAIN_{S(m,n)}$. For example, the ratio controller 330 acquires the parameter ($\alpha_{(m,n)}$) according to following formula;

$$\alpha_{(m,n)} = GAIN_{L(m,n)} \times GAIN_{H(m,n)} \times GAIN_{S(m,n)} \quad \text{[Formula 20]}$$

As described above, the ratio controller 330 increases the color coordinate contribution degree and decreases the brightness component contribution degree, as the brightness gets higher. Moreover, the ratio controller 330 increases the color coordinate contribution degree and decreases the brightness component contribution degree, as the hue is closer to the first target hue TG1 or the second target hue TG2. Moreover, the ratio controller 330 increases the color coordinate contribution degree and decreases the brightness component contribution degree, as the saturation gets higher.

The display element controller 340 controls, for the entire image (frame), the ratio between the color coordinate adjusted signals and the brightness adjusted signals, according to the parameter $\alpha_{(m,n)}$.

(Operation of Projection Display Apparatus)

Figure 29:
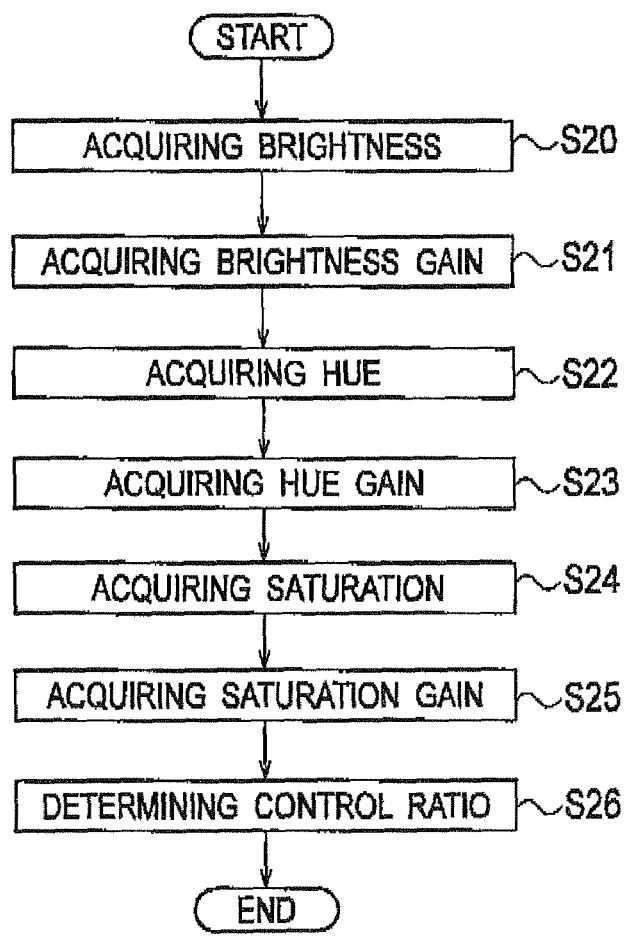
FIG. 29 is a flowchart showing an operation of the signal processing device 300 according to the fourth modified embodiment of the second embodiment.

Operation of the projection display apparatus according to the fourth modified embodiment will be described below with reference to the drawing. FIG. 29 is a flowchart showing an operation of the projection display apparatus 100 (the signal processing device 300) according to the fourth modified embodiment.

As shown in FIG. 29, in Step 20, the signal processing device 300 acquires the brightness of the pixel (m,n) forming the image (frame), according to the image input signal.

In Step 21, the signal processing device 300 acquires the brightness gain ($GAIN_{L(m,n)}$) according to the brightness acquired in Step 20.

In Step 22, the signal processing device 300 acquires the hue of the pixel (m,n) forming the image (frame), according to the image input signal.

In Step 23, the signal processing device 300 acquires the hue gain ($GAIN_{H(m,n)}$) according to the hue acquired in Step 22.

In Step 24, the signal processing device 300 acquires the saturation of the pixel (m,n) forming the image (frame), according to the image input signal.

In Step 25, the signal processing device 300 acquires the saturation gain ($GAIN_{S(m,n)}$) according to the saturation acquired in Step 24.

In Step 26, the signal processing device 300 determines the control ratio ($\alpha_{(m,n)}$) between the color coordinate contribution degree and the brightness coordinate contribution degree. Specifically, the signal processing device 300 determines the parameter ($\alpha_{(m,n)}$) corresponding to the pixel (m,n), according to each of gains acquired in Step 21, Step 23, and Step 25. Note that, the signal processing device 300 perform the process from Step 20 to Step 26, for all of the pixels forming the image (frame).

Advantages and Effects

In the fourth modified embodiment, the ratio controller 330 acquires the parameter ($\alpha_{(m,n)}$) for each of the pixels forming the image (frame), according to the brightness, the hue, and the saturation. That is, the display element controller 340 controls the ratio between the color coordinate contribution degree and the brightness coordinate contribution degree, for each of the pixels.

Therefore, both of effects, that is, suppress of glare in the first specific hue (the red hue, for example) and the second specific hue (the green hue, for example), and effective utilization of the color reproduction range of the liquid crystal panel.

[Other Embodiments]

The present invention has been described by the above-described embodiment. However, it should be understood that the description and drawings constituting a part of the disclosure do not limit the present invention. Various alternative embodiments, examples, and operational techniques will be apparent from the disclosure for those skilled in the art.

In the above-described embodiment, the liquid crystal panel 30 is used as the display device. However, the present invention is not limited to this. Alternatively, Liquid Crystal on Silicon (LCOS) or Digital Micromirror Device (DMD) may be used as the display device.

In the above-described embodiment, the solid-state light source is used as the light source. However, the present invention is not limited to this. Alternatively, a UHP lamp emitting white light may be used as the light source.

In the above-described embodiment, the HSV conversion is employed. Alternatively, YUV conversion may be employed. In such a case, it goes without saying that a luminance component is used instead of the brightness component.

In the above-described embodiment, each of the red pixel correction coefficient ΔR(n), the green pixel correction coefficient ΔG(n) and the blue pixel correction coefficient ΔB(n) is calculated for each of multiple pixels constituting an image (frame). However, the present invention is not limited to the embodiment. For example, each of the red pixel correction coefficient ΔR(n), the green pixel correction coefficient ΔG(n) and the blue pixel correction coefficient ΔB(n) may be calculated for each block constituting an image (frame). Here, the block is formed of multiple pixels. Moreover, it should be noted that a predetermined pixel unit is a term indicating the pixel or block.

The control ratio of the brightness component contribution degree may be determined based on the parameter β in the second modified embodiment and the parameter $\alpha_{(m,n)}$ in the fourth modified embodiment. Specifically, a multiplied value is obtained by multiplying the parameter β and the parameter $\alpha_{(m,n)}$. This may result in suppressing the glare in the first specific hue (the red hue, for example) and the second specific hue (the green hue, for example), and utilizing effectively the color reproduction range of the liquid crystal panel, even when a small number of pixels having the first specific hue or the second specific hue are included in the entire image (frame).

Although the average brightness is used for acquiring the parameter Lum in the above described first modified embodiment, the sum of the brightness of the pixels forming the image (frame) may be used for acquiring the parameter Lum.

Although the parameter β is determined according to the hue gain $GAIN_{H(m,n)}$ and the saturation gain $GAIN_{S(m,n)}$ in the second modified embodiment, the parameter β may be determined according to one of the hue gain $GAIN_{H(m,n)}$ and the saturation gain $GAIN_{S(m,n)}$.

Although the parameter γ is determined according to the hue distribution range $RANGE_H$ and the saturation distribution range $RANGE_S$ in the third modified embodiment, the parameter γ may be determined according to one of the hue distribution range $RANGE_H$ and the saturation distribution range $RANGE_S$.

Although the parameter $\alpha_{(m,n)}$ is determined according to the brightness gain $GAIN_{L(m,n)}$ in the fourth modified embodiment, the parameter $\alpha_{(m,n)}$ may be determined according to the sum of brightness or the average of brightness of the pixels forming the entire image (frame).

Although the parameter $\alpha_{(m,n)}$ is determined according to the brightness gain $GAIN_{L(m,n)}$, the hue gain $GAIN_{H(m,n)}$ and the saturation gain $GAIN_{S(m,n)}$ in the fourth modified embodiment, the parameter $\alpha_{(m,n)}$ may be determined according to one of the brightness gain $GAIN_{L(m,n)}$, the hue gain $GAIN_{H(m,n)}$ and the saturation gain $GAIN_{S(m,n)}$. For example, the parameter $\alpha_{(m,n)}$ may be determined according to only the brightness gain $GAIN_{L(m,n)}$. the parameter $\alpha_{(m,n)}$ may be determined according to only the hue gain $GAIN_{H(m,n)}$. the parameter $\alpha_{(m,n)}$ may be determined according to only the saturation gain $GAIN_{S(m,n)}$.

Although the detail explanation is not in the above embodiments, assuming that the first specific hue or the second specific hue is a blue hue, the brightness component contribution degree may be increased and the color coordinate contribution degree may be decreased, in the case where the difference between the color coordinates of the image and the color coordinates of the actual object is large.

What is claimed is:

1. A signal processing device converting an image input signal into an image output signal and outputting the image output signal to a display device, the signal processing device comprising:
   a color coordinate adjuster configured to perform color coordinate adjustment processing for adjusting color coordinates of the image input signal according to a color reproduction range of the display device;
   a brightness adjuster configured to perform brightness adjustment processing for adjusting a brightness component of the image input signal;
   an output signal outputting unit configured to output the image output signal obtained by using results of the color coordinate adjustment processing and the brightness adjustment processing; and
   a controller configured to control a color coordinate adjustment coefficient and a brightness adjustment coefficient on the basis of values of a pixel having a first hue and values of a pixel having a second hue, the color coordinate adjustment coefficient used for the color coordinate adjustment processing, the brightness adjustment coefficient used for the brightness adjustment processing, wherein
   the controller controls the brightness adjustment coefficient so as to decrease the brightness component of the image input signal, when saturation of the pixel having the first hue is high,
   the controller controls the brightness adjustment coefficient so as to increase the brightness component of the image input signal, when saturation of the pixel having the second hue is high, and
   the controller decreases the brightness adjustment coefficient when increasing the color coordinate adjustment coefficient.

2. The signal processing device according to claim 1, wherein the controller corrects the color coordinate adjustment coefficient and the brightness adjustment coefficient for each predetermined pixel unit.

3. The signal processing device according to claim 1, further comprising
   a saturation adjuster configured to perform saturation adjustment processing for adjusting a saturation component of the image input signal, wherein
   the controller controls a saturation adjustment coefficient on the basis of the values of the pixel having the first hue and the values of the pixel having the second hue, the saturation adjustment coefficient used for the saturation adjustment processing, and
   the controller decreases the saturation adjustment coefficient when increasing the color coordinate adjustment coefficient.

4. The signal processing device according to claim 1, wherein the controller controls the color coordinate adjustment coefficient and the brightness adjustment coefficient on the basis of values of a pixel having a third hue.

5. The signal processing device according to claim 1, wherein
   the first hue corresponds to a hue of red or green, and
   the second hue corresponds to a hue of blue.

6. A projection display apparatus comprising:
   the signal processing device according to claim 1;
   a display device configured to display an image according to an image output signal outputted from the signal processing device; and
   a projector configured to project the image displayed on the display device.

7. A signal processing device converting an image input signal into an image output signal and outputting the image output signal to a display device, the signal processing device comprising:
- a color coordinate adjuster configured to perform color coordinate adjustment processing for adjusting color coordinates of the image input signal according to a color reproduction range of the display device;
- a brightness adjuster configured to perform brightness adjustment processing for adjusting a brightness component of the image input signal;
- an output signal generator configured to generate the image output signal, based on the color coordinates adjusted by the color coordinate adjustment processing and the brightness component adjusted by the brightness adjustment processing; and
- a controller configured to control a color coordinate contribution degree and a brightness component contribution degree based on a saturation of the image input signal, the color coordinate contribution degree indicates a degree that the color coordinate adjustment processing influences the image output signal, the brightness component contribution degree indicates a degree that the brightness adjustment processing influences the image output signal, wherein
- the controller increases the color coordinate contribution degree and decreases the brightness component contribution degree, as the saturation of the image input signal gets higher in a first specific hue or a second specific hue.

8. The signal processing device according to claim 7, further comprising:
- an acquisition unit configured to acquire a brightness of an image according to the image input signal, wherein
- the controller increases a decreasing amount of the brightness component of the image input signal in the brightness adjustment processing, as the brightness acquired by the acquisition unit gets higher.

9. The signal processing device according to claim 7, further comprising:
- an acquisition unit configured to acquire a hue of each pixel forming an image based on the image input signal, wherein
- the first specific hue has a first hue range including a first target hue,
- the second specific hue has a second hue range including a second target hue,
- the controller increases the color coordinate contribution degree and decreases the brightness component contribution degree, as the hue acquired by acquisition unit is closer to the first target hue, and
- the controller increases the color coordinate contribution degree and decreases the brightness component contribution degree, as the hue acquired by acquisition unit is closer to the second target hue.

10. The signal processing device according to claim 7, further comprising:
- an acquisition unit configured to acquire a hue of each pixel forming an image based on the image input signal, wherein
- the controller increases the brightness component contribution degree and decreases the color coordinate contribution degree, as a first hue distribution range gets wider, the first hue distribution range indicates a range of the hue acquired by the acquisition unit distributed in the first specific hue,
- the controller increases the brightness component contribution degree and decreases the color coordinate contribution degree, as a second hue distribution range gets wider, the second hue distribution range indicates a range of the hue acquired by the acquisition unit distributed in the second specific hue.

11. The signal processing device according to claim 7, further comprising:
- an acquisition unit configured to acquire a saturation of each pixel forming an image based on the image input signal, wherein
- the controller increases the color coordinate contribution degree and decreases the brightness component contribution degree, as the saturation acquired by the acquisition unit gets higher.

12. The signal processing device according to claim 7, further comprising:
- an acquisition unit configured to acquire a saturation of each pixel forming an image based on the image input signal, wherein
- the controller increases the brightness component contribution degree and decreases the color coordinate contribution degree, as a first saturation distribution range gets wider, the first saturation distribution range indicates a range of the saturation acquired by the acquisition unit distributed in the first specific hue,
- the controller increases the brightness component contribution degree and decreases the color coordinate contribution degree, as a second saturation distribution range gets wider, the second saturation distribution range indicates a range of the saturation acquired by the acquisition unit distributed in the second specific hue.

13. The signal processing device according to claim 7, wherein
- the controller controls the color coordinate contribution degree and the brightness component contribution degree for each pixel.

14. A projection display apparatus comprising:
- the signal processing device according to claim 7;
- a display device configured to display an image according to an image output signal outputted from the signal processing device; and
- a projector configured to project the image displayed on the display device.

* * * * *